United States Patent
Shiromoto et al.

(10) Patent No.: US 10,138,319 B2
(45) Date of Patent: Nov. 27, 2018

(54) POLYMER AND ASPHALT COMPOSITION

(71) Applicant: Asahi Kasei Kabushiki Kaisha, Tokyo (JP)

(72) Inventors: Takayuki Shiromoto, Tokyo (JP); Shigeo Nakajima, Tokyo (JP); Yoshifumi Araki, Tokyo (JP); Nobuaki Kubo, Tokyo (JP); Takuya Suzuki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 193 days.

(21) Appl. No.: 15/111,891

(22) PCT Filed: Jan. 16, 2015

(86) PCT No.: PCT/JP2015/051045
§ 371 (c)(1),
(2) Date: Jul. 15, 2016

(87) PCT Pub. No.: WO2015/108139
PCT Pub. Date: Jul. 23, 2015

(65) Prior Publication Data
US 2016/0333132 A1    Nov. 17, 2016

(30) Foreign Application Priority Data

| Jan. 17, 2014 | (JP) | 2014-007292 |
| Apr. 17, 2014 | (JP) | 2014-085857 |
| Oct. 1, 2014 | (JP) | 2014-203035 |
| Oct. 1, 2014 | (JP) | 2014-203036 |
| Nov. 17, 2014 | (JP) | 2014-232735 |
| Nov. 17, 2014 | (JP) | 2014-232736 |

(51) Int. Cl.
*C08F 297/04* (2006.01)
*C08L 95/00* (2006.01)
*C08F 6/12* (2006.01)
*C08L 53/02* (2006.01)

(52) U.S. Cl.
CPC .............. *C08F 297/04* (2013.01); *C08F 6/12* (2013.01); *C08L 53/02* (2013.01); *C08L 95/00* (2013.01); *C08L 2555/80* (2013.01)

(58) Field of Classification Search
CPC .......... C08F 297/04; C08F 297/042; C08F 297/044; C08F 297/046; C08F 297/048; C08L 95/00; C08L 95/005
See application file for complete search history.

(56) References Cited

U.S. PATENT DOCUMENTS

| 4,145,322 A | 3/1979 | Maldonado et al. |
| 5,616,652 A * | 4/1997 | Kusano ............ C08F 8/04 525/315 |
| 6,120,913 A | 9/2000 | Kluttz et al. |
| 6,150,439 A | 11/2000 | Keiichi et al. |
| 6,451,964 B1 * | 9/2002 | Hakamaya ............ C08F 6/12 528/480 |
| 7,579,385 B1 | 8/2009 | Yamakoshi et al. |
| 2003/0149140 A1 | 8/2003 | Stephens et al. |
| 2005/0004273 A1 | 1/2005 | Chun et al. |
| 2005/0107521 A1 | 5/2005 | Sasagawa et al. |
| 2005/0222331 A1 * | 10/2005 | Hoshi ............... B32B 27/08 525/88 |
| 2006/0160955 A1 | 7/2006 | Boerner et al. |
| 2006/0178485 A1 | 8/2006 | Shimakage et al. |

FOREIGN PATENT DOCUMENTS

| EP | 0360656 A | 3/1990 |
| JP | S57-024385 B2 | 8/1978 |
| JP | S61-218614 A | 9/1986 |
| JP | H03-501035 A | 3/1991 |
| JP | H09-255716 A | 9/1997 |
| JP | H10-219117 A | 8/1998 |
| JP | H11-315187 A | 11/1999 |
| JP | 2004-091752 A | 3/2004 |
| JP | 2005-126485 A | 5/2005 |
| JP | 2005-513177 A | 5/2005 |
| JP | 2006-104359 A | 4/2006 |
| JP | 2006-160886 A | 6/2006 |
| JP | 2012-246378 A | 12/2012 |
| KR | 2005-0109993 A | 11/2005 |
| SG | 189956 A1 | 6/2013 |

(Continued)

OTHER PUBLICATIONS

WO201205699A1 English machine translation, prepared Mar. 18, 2018 (Year: 2018).*
International Search Report issued in corresponding International Patent Application No. PCT/JP2015/051045 dated Mar. 31, 2015.
International Preliminary Report on Patentability and Written Opinion issued in corresponding International Patent Application No. PCT/JP2015/051045 dated Jul. 19, 2016.
European Search Report issued in counterpart European Patent Application No. 15737557.7 dated Feb. 1, 2017.

*Primary Examiner* — Christopher M Rodd
(74) *Attorney, Agent, or Firm* — Morgan, Lewis & Bockius LLP

(57) ABSTRACT

The polymer according to the present invention is a polymer containing a conjugated diene monomer unit and a vinyl aromatic monomer unit, wherein the polymer has a polymer block (A) containing the vinyl aromatic monomer unit as a main component and a polymer block (B) containing the conjugated diene monomer unit and the vinyl aromatic monomer unit, a content of the polymer block (A) is 10% by mass or more and 40% by mass or less, a bulk density of the polymer is 0.05 g/mL or more and 0.45 g/mL or less, and a specific surface area of the polymer is 0.10 $m^2$/g or more and 0.60 $m^2$/g or less.

17 Claims, No Drawings

(56) References Cited

FOREIGN PATENT DOCUMENTS

| WO | 1999/055752 A1 | 11/1999 | |
|---|---|---|---|
| WO | 2001/030859 A1 | 5/2001 | |
| WO | 2012/056939 A1 | 5/2012 | |
| WO | WO-2012056939 A1 * | 5/2012 | ............... C08F 6/12 |

* cited by examiner

POLYMER AND ASPHALT COMPOSITION

TECHNICAL FIELD

The present invention relates to a polymer and an asphalt composition.

BACKGROUND ART

To date, asphalt compositions are widely used for road paving, waterproofing sheets, sound-proof sheets, roofing, and other applications. Numerous attempts have been made to improve the properties of asphalt by adding various polymers to the asphalt. Ethylene-vinyl acetate copolymers, ethylene-ethyl acrylate copolymers, rubber latexes, block copolymers composed of conjugated dienes and vinyl aromatic hydrocarbons, and the like are used as such polymers.

Recently, there are increasing demands for asphalt compositions that have excellent strength and wear resistance because of the increasing number and increasing speed of road going vehicles and other such reasons. Accordingly, a higher softening point and mechanical strength such as elongation, modulus, and the like are required and, therefore, dispersibility in asphalt compositions is required of block copolymers.

For example, Patent Document 1 discloses an asphalt composition comprising a copolymer that is composed of a conjugated diene and a vinyl aromatic hydrocarbon and that has a specific structure.

Patent Document 2 discloses an asphalt composition for roofing shingles, comprising a filler and a block copolymer composed of a vinyl aromatic hydrocarbon and a conjugated diene.

Patent Document 3 discloses an asphalt composition comprising a blowing agent as an additive, and Patent Document 4 discloses a vulcanized asphalt composition.

CITATION LIST

Patent Document

Patent Document 1: U.S. Patent Application Publication No. 2003/0149140
Patent Document 2: U.S. Pat. No. 6,120,913
Patent Document 3: Japanese Patent Laid-Open No. 10-219117
Patent Document 4: Japanese Patent Laid-Open No. 2005-513177

SUMMARY OF INVENTION

Technical Problem

However, satisfactory results are not yet obtained even from the methods disclosed in Patent Documents 1 to 4, and further improvements are desired.

The present invention has been conceived in view of the problems of the conventional art described above, and an object of the present invention is to provide a polymer that demonstrates excellent dispersibility when formed into an asphalt composition.

Solution to Problem

In order to solve the problems described above, the inventors conducted diligent research into the improvement of properties of a composition containing a polymer and asphalt. As a result, the inventors found that a polymer having a specific configuration demonstrates excellent dispersibility when formed into an asphalt composition, and accomplished the present invention.

Specifically, the present invention is as follows:

[1]
A polymer comprising a conjugated diene monomer unit and a vinyl aromatic monomer unit,
wherein the polymer has a polymer block (A) comprising the vinyl aromatic monomer unit as a main component and a polymer block (B) comprising the conjugated diene monomer unit and the vinyl aromatic monomer unit,
a content of the polymer block (A) is 10% by mass or more and 40% by mass or less,
a bulk density of the polymer is 0.05 g/mL or more and 0.45 g/mL or less, and
a specific surface area of the polymer is 0.10 m$^2$/g or more and 0.60 m$^2$/g or less.

[2]
The polymer according to [1], wherein a hydrogenation rate of double bonds in the conjugated diene monomer unit is 95 mol % or more.

[3]
The polymer according to [1], wherein a hydrogenation rate of double bonds in the conjugated diene monomer unit is 0 mol % or more and less than 50 mol %.

[4]
The polymer according to [1], wherein a hydrogenation rate of double bonds in the conjugated diene monomer unit is 50 mol % or more and less than 95 mol %.

[5]
The polymer according to any of [1] to [4], wherein the specific surface area is 0.30 m$^2$/g or more and 0.60 m$^2$/g or less.

[6]
The polymer according to any of [1] to [4], wherein the specific surface area is 0.10 m$^2$/g or more and less than 0.30 m$^2$/g.

[7]
The polymer according to any of [1] to [6], wherein a proportion of components that pass through a sieve having a mesh size of 3.35 mm and do not pass through a sieve having a mesh size of 0.425 mm is less than 80% by mass based on a total amount of crumbs.

[8]
The polymer according to any of [1] to [7], wherein the polymer has a peak molecular weight of less than 200,000.

[9]
The polymer according to any of [1] to [8], wherein a content of the vinyl aromatic monomer unit is 20% by mass or more and 60% by mass or less.

[10]
The polymer according to any of [1] to [9], wherein in the polymer block (B), a content of a short-chain vinyl aromatic monomer-polymerized moiety comprising 2 to 6 vinyl aromatic monomer units is 50% by mass or more based on the content of the vinyl aromatic monomer unit being 100% by mass.

[11]
The polymer according to [10], wherein the content of the short-chain vinyl aromatic monomer-polymerized moiety is 70% by mass or more.

[12]
The polymer according to any of [1] to [11], wherein the polymer has a functional group.

[13]

An asphalt composition comprising 0.5 parts by mass or more and 50 parts by mass or less of the polymer according to any of [1] to [12] and 100 parts by mass of an asphalt.

[14]

An asphalt composition comprising:

a mixture comprising the polymer according to any of [1] to [12] and a block copolymer (a); and an asphalt, wherein the block copolymer (a) has a polymer block (A') comprising at least one vinyl aromatic monomer unit as a main component and a polymer block (C) comprising at least one conjugated diene monomer unit as a main component, a content of the mixture is 0.5 parts by mass or more and 50 parts by mass or less based on 100 parts by mass of the asphalt, and a content of the block copolymer (a) in the mixture is 15 to 85% by mass.

[15]

The asphalt composition according to [13] or [14], further comprising 0.03 parts by mass or more and 3 parts by mass or less of sulfur or a sulfur compound.

Advantageous Effect of the Invention

The polymer of the present invention is capable of demonstrating excellent dispersibility when formed into an asphalt composition.

DESCRIPTION OF EMBODIMENT

Below, an embodiment for carrying out the present invention (hereinafter referred to as "the present embodiment") will now be described in detail. The present invention is not limited to the present embodiment below, and various modifications can be made within the scope of the present invention to carry out the invention.

<Polymer>

The polymer of the present embodiment is a polymer comprising a conjugated diene monomer unit and a vinyl aromatic monomer unit. Moreover, the polymer of the present embodiment has a polymer block (A) comprising the vinyl aromatic monomer unit as a main component and a polymer block (B) comprising the conjugated diene monomer unit and the vinyl aromatic monomer unit, and the content of the polymer block (A) is 10% by mass or more and 40% by mass or less. Furthermore, the polymer of the present embodiment has a bulk density of 0.05 g/mL or more and 0.45 g/mL or less, and a specific surface area of 0.10 $m^2/g$ or more and 0.60 $m^2/g$ or less.

Being configured as described above, the polymer of the present embodiment is capable of demonstrating excellent dispersibility when formed into an asphalt composition.

Below, the polymer of the present embodiment in the case of not being hydrogenated, and before being hydrogenated, may be referred to as a "base non-hydrogenated polymer". Moreover, the polymer of the present embodiment after hydrogenation may be referred to as a "hydrogenated polymer".

In the polymer of the present embodiment, the conjugated diene monomer unit is a unit for one conjugated diene compound resulting from the polymerization of conjugated diene compounds.

The conjugated diene compound is a diolefin having a pair of conjugated double bonds, and examples of conjugated diene compounds include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. In particular, 1,3-butadiene and isoprene are preferable. Not only one conjugated diene compound but also two or more may be used.

In the polymer of the present embodiment, the vinyl aromatic monomer unit is a unit for one vinyl aromatic compound resulting from the polymerization of vinyl aromatic compounds.

Examples of vinyl aromatic compounds include, but are not limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene. Not only one vinyl aromatic compound but also two or more may be used.

In the present embodiment, the polymer block (A) is a block comprising the vinyl aromatic monomer unit as a main component. Here, the phrase "comprising the vinyl aromatic monomer unit as a main component" means that the vinyl aromatic monomer unit is contained in the polymer block (A) in an amount of 60% by mass or more, preferably 80% by mass or more, more preferably 90% by mass or more, and even more preferably 95% by mass or more. Although the upper limit is not particularly specified, it is preferably 100% by mass or less, and preferably 99% by mass or less. As described above, the content of the vinyl aromatic monomer unit in the polymer block (A) is preferably more than 95% by mass and 100% by mass or less, more preferably 96% by mass or more and 100% by mass or less, and even more preferably 97% by mass or more and 100% by mass or less.

The content of the polymer block (A) is 10% by mass or more and 40% by mass or less based on the polymer of the present embodiment. When the content of the polymer block (A) in the polymer is within the above range, an asphalt composition having a high softening point is obtained. A higher content of the polymer block (A) is more preferable, in order to obtain an asphalt composition having a higher softening point even when the content of the polymer contained therein is higher. From the viewpoint of increasing the softening point, the content of the polymer block (A) is 10% by mass or more, preferably 13% by mass or more, more preferably 16% by mass or more, and even more preferably 17% by mass or more. Moreover, from the viewpoint of the flexibility, high-temperature storage stability, and weather resistance of the polymer of the present embodiment or the asphalt composition, the content is 40% by mass or less, preferably 35% by mass or less, more preferably 33% by mass or less, even more preferably 30% by mass or less, yet more preferably 26% by mass or less, further preferably 23% by mass or less, and much more preferably 21% by mass or less.

From the viewpoint of the softening point and high-temperature storage stability of the asphalt composition, the content of the polymer block (A) in the polymer is preferably 15% by mass or more and 35% by mass or less, and more preferably 20% by mass or more and 30% by mass or less.

The content of the polymer block (A) in the present embodiment can be determined according to the following formula using the mass of the vinyl aromatic polymer block component (provided that the vinyl aromatic polymer block component having an average degree of polymerization of about 30 or less is excluded) determined by a method in which the polymer is oxidatively decomposed by tertiary-butyl hydroperoxide in the presence of an osmium tetroxide catalyst (the method described in I. M. KOLTHOFF, et al., J. Polym. Sci., 1, p. 429 (1946)).

Content (% by mass) of polymer block (A)=(Mass of vinyl aromatic polymer block component/ Mass of polymer)×100

The content of the polymer block (A) in the polymer in the case where the polymer is hydrogenated is nearly identical to the content of the polymer block (A) based on the base non-hydrogenated polymer and, therefore, in the present embodiment, the content of the polymer block (A) in the hydrogenated polymer may be determined as the content of the polymer block (A) in the base non-hydrogenated polymer.

In the present embodiment, the polymer block (B) is a block comprising the conjugated diene monomer unit and the vinyl aromatic monomer unit, and the content of the vinyl aromatic monomer unit in the polymer block (B) is preferably 10% by mass or more and less than 60% by mass.

From the viewpoint of high-temperature storage stability, softening point, and dispersibility, the content of the vinyl aromatic monomer unit contained in the polymer block (B) comprising the conjugated diene monomer unit and the vinyl aromatic monomer unit in the polymer of the present embodiment is preferably 10% by mass or more, more preferably 20% by mass or more, and even more preferably 25% by mass or more.

Moreover, from the viewpoint of viscosity and dispersibility, the content is preferably less than 60% by mass, more preferably 50% by mass or less, even more preferably 40% by mass or less, yet more preferably 35% by mass or less, and further preferably 30% by mass or less.

Especially, the content range of the vinyl aromatic monomer unit in the polymer block (B) is preferably 10% by mass or more and 50% by mass or less, and more preferably 10% by mass or more and 40% by mass or less.

The polymer block (B) is preferably a random block. Here, the term "random" refers to a state in which the number of continuous vinyl aromatic monomer units in the polymer is 10 or less.

In the polymer of the present embodiment, (RS), which is the vinyl aromatic monomer unit content in the polymer block (B), is determined by subtracting (BS), which is the content of the block (A) comprising the vinyl aromatic monomer unit as a main component, from (TS), which is the vinyl aromatic monomer unit content in the polymer.

Specifically, it can be determined by RS (% by mass)=(TS−BS)/(100−BS)×100

From the viewpoint of solubility in asphalt and softening point, the content of the polymer block (B) in the polymer of the present embodiment is preferably 60% by mass or more and 90% by mass or less, more preferably 65% by mass or more and 85% by mass or less, and even more preferably 70% by mass or more and 80% by mass or less.

The amount (% by mass) of polymer blocks of vinyl aromatic monomers based on the total amount (% by mass) of vinyl aromatic monomer units used for polymerizing the polymer block (A), i.e., the block ratio, is preferably 16.6% or more and 96.5% or less, more preferably 20% or more and 90% or less, and even more preferably 25% or more and 85% or less. The above preferable range is likely to result in an excellent balance between softening point and dispersibility.

The block ratio in the present embodiment can be calculated according to the following formula using the values, as set forth in the Examples provided below, of the content of the vinyl aromatic monomer unit (styrene content) in the polymer and the content of the polymer block (A) in the polymer.

Block ratio=Content of polymer block (A) in polymer/Content of vinyl aromatic monomer unit in polymer×100(%)

In the present embodiment, the content of the vinyl aromatic monomer unit is preferably 20% by mass or more and 60% by mass or less based on the polymer. When the content of the vinyl aromatic monomer unit in the polymer is within the above range, an asphalt composition having an excellent softening point and elongation is likely to be obtained.

From the viewpoint of the softening point, elongation, high-temperature storage stability, separation stability, and heat deterioration resistance of the asphalt composition, the content is preferably 20% by mass or more, more preferably 25% by mass or more, even more preferably 33% by mass or more, yet more preferably 37% by mass or more, and further preferably 40% by mass or more. Moreover, from the viewpoint of the elongation, weather resistance, and flexibility of the asphalt composition, the content is preferably 60% by mass or less, more preferably 50% by mass or less, even more preferably 48% by mass or less, and yet more preferably 45% by mass or less.

From the viewpoint of the balance of the softening point, elongation, and the like of the asphalt composition, the content of the vinyl aromatic monomer unit in the polymer is more preferably 25% by mass or more and 55% by mass or less, even more preferably 30% by mass or more and 55% by mass or less, and yet more preferably 30% by mass or more and 50% by mass or less.

The content of the vinyl aromatic monomer unit can be measured by the method described in the Examples provided below.

The content of the vinyl aromatic monomer unit based on the polymer in the case where the polymer is hydrogenated is nearly identical to the content of the vinyl aromatic monomer unit based on the base non-hydrogenated polymer and, therefore, the content of the vinyl aromatic monomer unit in the case where the polymer is hydrogenated may be determined as the content of the vinyl aromatic monomer unit based on the base non-hydrogenated polymer.

In the present embodiment, the content of the conjugated diene monomer unit constituting vinyl bonds that are 1,2-bonds and/or 3,4-bonds (hereinafter also referred to as the amount of vinyl bonds) based on the total content of the conjugated diene monomer unit in the base non-hydrogenated random polymer, from the viewpoint of the softening point and elongation of the asphalt composition, is preferably 15 mol % or more and 50 mol % or less, more preferably 18 mol % or more and 45 mol % or less, even more preferably 18 mol % or more and 40 mol % or less, yet more preferably 21 mol % or more and 40 mol % or less, further preferably 21 mol % or more and 32 mol % or less, and much more preferably 24 mol % or more and 30 mol % or less.

The amount of vinyl bonds can be measured by NMR and, specifically, can be determined by the method described in the Examples provided below.

The distribution of vinyl content in the copolymer block comprising the conjugated diene monomer unit is not particularly limited.

The microstructure (the proportions of cis, trans, and vinyl) of the conjugated diene monomer unit in the base non-hydrogenated random polymer can be adjusted by using, for example, a polar compound which will be described below.

In the present embodiment, the melt flow rate (MFR (L)) of the hydrogenated polymer is preferably 0.05 or more and 10 or less.

When the MFR of the hydrogenated polymer is within the above range, an asphalt composition having favorable asphalt characteristics such as softening point and excellent handleability (low viscosity) is likely to be obtained. From the viewpoint of a balance between asphalt characteristics and handleability, the MFR (L) of the hydrogenated polymer is more preferably 0.1 or more and 5 or less, and even more preferably 0.2 or more and 2 or less.

The MFR can be calculated by a method in accordance with JIS-K 7210 using the hydrogenated polymer and a melt indexer (L247; manufactured by TECHNOLSEVEN CO., LTD). Such measurement can be performed under condition L in which a test temperature is 230° C., a test load is 2.16 kgf, and the unit of a measurement value is g/10 min.

In the present embodiment, from the viewpoint of the melt viscosity, softening point, dispersibility, and high-temperature storage stability of the asphalt composition, the weight average molecular weight (Mw) of the polymer is preferably 50,000 or more and 320,000 or less, more preferably 50,000 or more and 300,000 or less, even more preferably 60,000 or more and 280,000 or less, yet more preferably 70,000 or more and 260,000 or less, and further preferably 70,000 or more and less than 200,000.

From the viewpoint of softening point and high-temperature storage stability, from the viewpoint of reducing the amount of the polymer added based on asphalt, and from the viewpoint of recovery after tension of the polymer and the asphalt composition, the weight average molecular weight (Mw) of the polymer is preferably 50,000 or more, more preferably 130,000 or more, even more preferably 150,000 or more, yet more preferably 160,000 or more, and further preferably 170,000 or more. Moreover, from the viewpoint of producibility, the melt viscosity of the asphalt composition, and dispersibility, the weight average molecular weight is preferably 320,000 or less, more preferably 300,000 or less, even more preferably 280,000 or less, yet more preferably 230,000 or less, further preferably 210,000 or less, and much more preferably less than 200,000.

Moreover, from the viewpoint of producibility, the melt viscosity of the asphalt composition, and dispersibility, the peak molecular weight of the polymer of the present embodiment is preferably less than 200,000, more preferably 60,000 or more, and even more preferably 80,000 or more and 190,000 or less.

In the present embodiment, the molecular weight distribution (Mw/Mn) (the ratio of the weight average molecular weight (Mw) to the number average molecular weight (Mn)) of the polymer is preferably 10 or less, more preferably 1.01 or more and 8 or less, and even more preferably 1.05 or more and 5 or less. In the case of placing emphasis on handleability, Mw/Mn is yet more preferably 1.05 or more and 3 or less.

From the viewpoint of reducing the amount of the polymer added based on asphalt, Mw/Mn is preferably 1.03 or more, more preferably 1.05 or more, even more preferably 1.11 or more, and yet more preferably 1.20 or more. Moreover, from the viewpoint of producibility and reducing the amount of the polymer added based on asphalt, Mw/Mn is preferably 2.0 or less, more preferably 1.7 or less, even more preferably 1.4 or less, and yet more preferably 1.3 or less.

The weight average molecular weight, peak molecular weight, and molecular weight distribution of the polymer in the present embodiment can be determined by the methods described in the Examples provided below.

The weight average molecular weight and the molecular weight distribution of the polymer in the case where the polymer is hydrogenated is nearly identical to the weight average molecular weight and the molecular weight distribution of the base non-hydrogenated polymer and, therefore, the weight average molecular weight and the molecular weight distribution of the base non-hydrogenated polymer may be used even in the case where the polymer is hydrogenated.

In the present embodiment, in the case where the polymer is hydrogenated, the hydrogenation rate of double bonds in the conjugated diene monomer unit of the base non-hydrogenated polymer is preferably 0 mol % or more and less than 95 mol % from the following viewpoints.

That is to say, from the viewpoint of the softening point, high-temperature storage stability, and UV resistance of the asphalt composition, the hydrogenation rate of double bonds in the conjugated diene monomer unit in the polymer is preferably 0 mol % or more, more preferably 30 mol % or more, even more preferably 50 mol % or more, and yet more preferably 70 mol % or more.

Moreover, from the viewpoint of lowering the viscosity of the asphalt composition, the hydrogenation rate is preferably less than 95 mol %, more preferably 93 mol % or less, even more preferably 91 mol % or less, and yet more preferably 90 mol % or less.

From the viewpoint of the melt viscosity, high-temperature storage stability, and UV resistance of the asphalt composition, the hydrogenation rate of double bonds in the conjugated diene monomer unit of the polymer is preferably 0 mol % or more and less than 50 mol %, more preferably 10 mol % or more and less than 50 mol %, and even more preferably 20 mol % or more and less than 50 mol %.

On the other hand, from the viewpoint of the softening point, high-temperature storage stability, and UV resistance of the asphalt composition, the hydrogenation rate of double bonds in the conjugated diene monomer unit of the polymer is preferably 50 mol % or more and less than 95 mol %, more preferably 50 mol % or more and 92 mol % or less, even more preferably 50 mol % or more and 90 mol % or less, and yet more preferably 70 mol % or more and 90 mol % or less.

In particular, when the specific surface area of the polymer is 0.05 to 0.40 $m^2/g$, a hydrogenation rate of 50 mol % or more and less than 95 mol % is likely to result in a more favorable dispersibility and is thus preferable. A hydrogenation rate of 50 mol % or more and 90 mol % or less is more preferable.

From the viewpoint of reducing the amount of the polymer added based on asphalt and from the viewpoint of increased heat deterioration resistance during storage and increased weather resistance and resistance to repetitive deformation, the hydrogenation rate of double bonds in the conjugated diene monomer unit of the polymer is preferably 95 mol % or more, more preferably 96 mol % or more, even more preferably 98 mol % or more, and yet more preferably 99 mol % or more.

Moreover, from the viewpoint of lowering the viscosity of the asphalt composition, the hydrogenation rate is preferably 99 mol % or less, more preferably 97 mol % or less, and even more preferably 96 mol % or less.

The hydrogenation rate of the polymer can be determined by the method described in the Examples provided below.

In the present embodiment, from the viewpoint of producibility, softening point, viscosity, and dispersibility, it is preferable that the weight average molecular weight and the hydrogenation rate satisfy the following relational expression:

$$-0.1X+23 \leq Y \leq -0.114X+38.83$$

wherein X represents the hydrogenation rate (mol %), and Y represents the weight average molecular weight (×10,000).

In the present embodiment, it is preferable that the hydrogenated polymer has two or more polymer blocks (A). When the polymer has two or more polymer blocks (A), an asphalt composition having a high softening point and a high level of elongation is likely to be obtained.

As for the polymer structure in the present embodiment, a polymer having any structure is usable. Examples of such polymer structures include those represented by the following formulae.

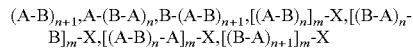

(In the above formulae, each A independently represents the polymer block (A); each B independently represents the polymer block (B); each n independently represents an integer of 1 or greater and is preferably an integer of 1 to 5; each m independently represents an integer of 2 or greater and is preferably an integer of 2 to 11; and each X independently represents a residue of a coupling agent or a residue of a polyfunctional initiator.)

Among these, the A-B-A structure is preferable because it has an excellent balance of asphalt characteristics in softening point, elongation, and dispersibility.

Moreover, as for the coupling structure, a linear structure is preferable from the viewpoint of lowering the viscosity of the asphalt composition, and from the viewpoint of increasing the softening point of the asphalt composition, a radial structure is preferable. As for the radial structure, a 3-branch or 4-branch structure is preferable, and it is more preferable to have both a 3-branch structure and a 4-branch structure. Moreover, as for the ratio of the 3-branch structure to the 4-branch structure, those having a 3-branch/4-branch of 5/95 to 95/5 are usable. From the viewpoint of increasing the softening point, the 3-branch/4-branch is preferably 90/10 or less, more preferably 75/25 or less, even more preferably 60/40 or less, and yet more preferably 40/60 or less. Moreover, from the viewpoint of lowering viscosity, the 3-branch/4-branch is preferably 10/90 or more, more preferably 25/75 or more, even more preferably 50/50 or more, and yet more preferably 70/30 or more.

In the present embodiment, the bulk density of the polymer is 0.05 g/mL or more and 0.45 g/mL or less. When the bulk density of the polymer is within the above range, an asphalt composition having excellent elongation and dispersibility is obtained.

Moreover, from the viewpoint of dispersibility, increased workability, and reduction of transportation costs, and the like, the bulk density is 0.05 g/mL or more, preferably 0.10 g/mL or more, more preferably 0.17 g/mL or more, and even more preferably 0.25 g/mL or more. From the viewpoint of reducing the amount of the polymer added based on asphalt and from the viewpoint of dispersibility and elongation, the bulk density is 0.45 g/mL or less, preferably 0.42 g/mL or less, more preferably 0.39 g/mL or less, even more preferably 0.38 g/mL or less, yet more preferably, 0.35 g/mL or less, and further preferably 0.30 g/mL or less.

The bulk density of the polymer can be measured by the method described in the Examples provided below.

In the present embodiment, the specific surface area of the polymer is 0.10 m²/g or more and 0.60 m²/g or less. When the specific surface area of the polymer is within the above range, an asphalt composition having excellent elongation and dispersibility is obtained.

From the viewpoint of reducing the amount of the polymer added based on asphalt, from the viewpoint of high solubility in asphalt, and from the viewpoint of dispersibility and elongation, the specific surface area is 0.10 m²/g or more, preferably 0.20 m²/g or more, more preferably 0.30 m²/g or more, even more preferably 0.40 m²/g or more, and further preferably 0.41 m²/g or more. Moreover, from the viewpoint of reducing the amount of the polymer added based on asphalt and from the viewpoint of high solubility in asphalt, dispersibility, elongation, high workability, reduction of transportation costs, and the like, the specific surface area is 0.60 m²/g or less, preferably 0.55 m²/g or less, more preferably 0.52 m²/g or less, even more preferably 0.50 m²/g or less, and yet more preferably 0.48 m²/g or less.

From the elongation and dispersibility of the asphalt composition, the specific surface area of the polymer is preferably 0.10 m²/g or more and 0.55 m²/g or less, and more preferably 0.10 m²/g or more and 0.50 m²/g or less. Furthermore, from the viewpoint of solubility in the asphalt composition, the specific surface area is preferably 0.30 m²/g or more and 0.60 m²/g or less, and from the viewpoint of transportability, the specific surface area is preferably 0.10 m²/g or more and less than 0.30 m²/g.

The bulk density of the polymer can be measured by the method described in the Example provided below.

Concerning the polymer of the present embodiment, the proportion of components that pass through a sieve having a mesh size of 3.35 mm and do not pass through a sieve having a mesh size of 0.425 mm is preferably less than 80% by mass based on the total amount of crumbs.

From the viewpoint of the solubility of the polymer in asphalt, the proportion is preferably 3% by mass or more, more preferably 10% by mass or more, even more preferably 30% by mass or more, yet more preferably 50% by mass or more, and most preferably 80% or more. Moreover, from the viewpoint of adhesion, the proportion is preferably 97% by mass or less and more preferably 90% by mass or less and, in particular, from the viewpoint of clogging during the transporting process, dust explosion, and the like, the proportion is preferably less than 80% by mass, more preferably 60% by mass or less, and most preferably 40% by mass or less.

The polymer of the present embodiment is a crumb having a particular bulk density and a particular specific surface area. The "crumb" in this specification refers to one solid form of a polymer and is distinguished from pellets and powders.

The polymer of the present embodiment can be produced by the method described below, but the method is not particularly limited.

The method for producing the base non-hydrogenated polymer comprising a conjugated diene monomer unit and a vinyl aromatic monomer unit is not particularly limited, and known methods are usable. For example, the base non-hydrogenated polymer can be produced by living anionic polymerization using a polymerization initiator such as an organoalkali metal compound in a hydrocarbon solvent.

Examples of hydrocarbon solvents include aliphatic hydrocarbons such as n-butane, isobutane, n-pentane, n-hexane, n-heptane, and n-octane; alicyclic hydrocarbons such as cyclohexane, cycloheptane, and methyl cycloheptane; and aromatic hydrocarbons such as benzene, toluene, xylene, and ethylbenzene.

Example of polymerization initiators include aliphatic hydrocarbon alkali metal compounds, aromatic hydrocarbon alkali metal compounds, and organic amino alkali metal compounds that have anionically polymerizing activity on a conjugated diene and a vinyl aromatic compound.

Examples of alkali metals include lithium, sodium, and potassium.

In the present embodiment, when polymerizing a conjugated diene compound and a vinyl aromatic compound using an organoalkali metal compound as a polymerization initiator, a polar compound can be used in order to adjust the amount of vinyl bonds (1,2-vinyl bonds or 3,4-vinyl bonds) resulting from the conjugated diene monomer unit incorporated into the polymer and adjust the random-polymerization characteristics of a conjugated diene and a vinyl aromatic compound. That is to say, a tertiary amine compound or an ether compound, which is a polar compound, can be added as an adjuster.

Examples of tertiary amine compounds include, but are not limited to, compounds represented by formula R1R2R3N (provided that R1, R2, and R3 are each independently a $C_{1-20}$ hydrocarbon group or hydrocarbon group having a tertiary amino group).

Specific examples thereof include, but are not limited to, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine.

Examples of ether compounds include, but are not limited to, linear ether compounds, and cyclic ether compounds.

Specific examples of linear ether compounds include, but are not limited to, dimethyl ether, diethyl ether, and diphenyl ether; dialkyl ether compounds of ethylene glycol, such as ethylene glycol dimethyl ether, ethylene glycol diethyl ether, and ethylene glycol dibutyl ether; and dialkyl ether compounds of diethylene glycol, such as diethylene glycol dimethyl ether, diethylene glycol diethyl ether, and diethylene glycol dibutyl ether.

Specific examples of cyclic ether compounds include, but are not limited to, tetrahydrofuran, dioxane, 2,5-dimethyloxolane, 2,2,5,5-tetramethyloxolane, 2,2-bis(2-oxolanyl) propane, and furfuryl alcohol alkyl ethers.

In the present embodiment, the method for polymerizing a conjugated diene compound and a vinyl aromatic compound using an organoalkali metal compound as a polymerization initiator may be batch polymerization or continuous polymerization, or may be a combination thereof. The polymerization temperature is not particularly limited, and is usually 0° C. or more and 180° C. or less, and preferably 30° C. or more and 150° C. or less. Although the time necessary for polymerization depends on other factors, it is usually within 48 hours and preferably 0.1 to 10 hours. The atmosphere of the polymerization system is not particularly limited, and is preferably an atmosphere of inert gas such as nitrogen gas. The polymerization pressure is not particularly limited as long as it is within a pressure range sufficient to maintain monomers and solvents in a liquid phase at the above polymerization temperature range. Preferably, care should be taken not to allow impurities (such as water, oxygen, and carbon dioxide) that inactivate the catalyst and the living polymer to enter the polymerization system.

In the present embodiment, at the time of terminating the polymerization, it is possible to perform a coupling reaction by using a bi- or higher functional coupling agent. The bi- or higher functional coupling agent is not particularly limited, and known coupling agents are usable.

Examples of bifunctional coupling agents include, but are not limited to, dihalogen compounds such as dimethyldichlorosilane and dimethyldibromosilane; and acid esters such as methyl benzoate, ethyl benzoate, phenyl benzoate, and phthalic esters. Examples of polyfunctional coupling agent having tri- or higher functionality include polyalcohols having a valency of 3 or greater; polyvalent epoxy compounds such as epoxidized soybean oil and diglycidyl bisphenol A; halogenated silicon compounds represented by formula $R_{4-n}SiX_n$ (provided that each R independently represents a $C_{1-20}$ hydrocarbon group, each X independently represents a halogen atom, and n represents 3 or 4) such as methylsilyl trichloride, t-butylsilyl trichloride, silicon tetrachloride, and bromides thereof; halogenated tin compounds represented by formula $R_{4-n}SnX_n$ (provided that each R independently represents a $C_{1-20}$ hydrocarbon group, each X independently represents a halogen atom, and n represents 3 or 4) such as polyvalent halogen compounds such as methyltin trichloride, t-butyltin trichloride, and tin tetrachloride. Moreover, dimethyl carbonate, diethyl carbonate, 1,3-bis(N, N'-diglycidyl aminomethyl)cyclohexane, and the like are also usable as polyfunctional coupling agents.

The content of a short-chain vinyl aromatic monomer-polymerized moiety in the polymer block (B) in the present embodiment is preferably 50% by mass or more. Due to the content of a short-chain vinyl aromatic monomer-polymerized moiety in the polymer block (B) being within the above range, an asphalt composition having excellent elongation and dispersibility is likely to be obtained. From the viewpoint of the elongation and dispersibility of the asphalt composition, the content of a short-chain vinyl aromatic monomer-polymerized moiety is more preferably 70% by mass or more, even more preferably 80% by mass or more, and yet more preferably 90% by mass or more.

Here, the short-chain vinyl aromatic monomer-polymerized moiety refers to a component comprising 2 to 6 vinyl aromatic monomer units in the polymer block (B). The content of a short-chain vinyl aromatic monomer-polymerized moiety is determined as the content of linkages of 2 to 6 vinyl aromatic monomer units, with the content of the vinyl aromatic monomer units in the polymer block (B) defined as 100% by mass.

Moreover, from the viewpoint of increasing compatibility with asphalt, the content of the linkage of 2 vinyl aromatic monomer units is preferably 10% by mass or more and 45% by mass or less, more preferably 13% by mass or more and 42% by mass or less, and even more preferably 19% by mass or more and 36% by mass or less, based on 100% by mass of the vinyl aromatic monomer unit in the polymer block (B).

Moreover, from the viewpoint of increasing compatibility with asphalt, the content of the linkage of 3 vinyl aromatic monomer units is preferably 45% by mass or more and 80% by mass or less, more preferably 45% by mass or more and 75% by mass or less, and even more preferably 45% by mass or more and 65% by mass or less, based on 100% by mass of the vinyl aromatic monomer unit in the polymer block (B).

In particular, when the hydrogenation rate is 50 mol % or more and less than 95 mol % and the specific surface area is 0.05 m²/g or more and 0.40 m²/g or more, a content of a short-chain vinyl aromatic monomer-polymerized moiety in the polymer block (B) of 90% or more results in a more favorable dispersibility and is thus preferable. Furthermore, in this case, the hydrogenation rate is more preferably 50 mol % or more and 90 mol % or less.

The content of a short-chain vinyl aromatic monomer-polymerized moiety in the polymer block (B) can be controlled, for example, by adjusting the number of instances of adding a conjugated diene monomer and an aromatic vinyl monomer, the time of addition, the inner temperature of a reactor, and the like when polymerizing the polymer block (B). More specifically, the content can be controlled, for example, by adjusting any of the number of instances of addition, the time of addition, and the inner temperature of a reactor, or adjusting these in an appropriate combination.

An increased number of instances of addition is likely to increase the content of a short-chain vinyl aromatic monomer-polymerized moiety, and the number is preferably 2 or greater.

A longer time of addition is likely to increase the content of a short-chain vinyl aromatic monomer-polymerized moiety, and in the case where the number of instances of addition is 1, the time is preferably 20 minutes or more and 80 minutes or less.

A higher inner temperature of a reactor is likely to increase the content of a short-chain vinyl aromatic monomer-polymerized moiety, and the temperature is preferably 56° C. to 90° C.

In the case where the number of instances of addition is 2, more specifically the content can be adjusted to be within the above range by the time of adding a conjugated diene monomer and an aromatic vinyl monomer (the first supply time described below is 2 to 7 minutes, and the second supply time is 10 to 30 minutes) and an inner temperature of a reactor within the range of 56 to 84° C.

In the present embodiment, the vinyl aromatic monomer unit in the polymer block (B) may be uniformly distributed or may be distributed in a tapered, step-wise, convex, or concave manner.

Here, the tapered structure means a structure in which the content of the vinyl aromatic monomer unit gradually increases along the polymer chain in the polymer block (B).

The structure satisfies relationships $S2/S1>1$ and $S3/S2>1$, where S1 represents the content of the vinyl aromatic monomer unit in the polymer block (B) immediately after the beginning of polymerization of the polymer block (B), S2 represents the content of the vinyl aromatic monomer unit in the polymer during the course of polymerization, for example, at the time when a half of the introduced monomers are polymerized, and S3 represents the content of the vinyl aromatic monomer unit in the polymer block (B) after the completion of polymerization.

The polymer block (B) may have a plurality of portions where the vinyl aromatic monomer unit is uniformly distributed and/or a plurality of portions where the vinyl aromatic monomer unit is distributed in a tapered manner. Moreover, the polymer block (B) may have a plurality of segments where the content of the vinyl aromatic monomer unit is different.

It is preferable that the polymer of the present embodiment does not substantially have a crystallization peak resulting from the polymer block (B) in the −20 to 80° C. range in a chart obtained by differential scanning calorimetry (DSC). Here, the phrase "not substantially have a crystallization peak resulting from the polymer block (B) in the −20 to 80° C. range" means that a peak resulting from the crystallization of the polymer block (B) does not appear in this temperature range or that, although a peak resulting from crystallization is recognized, the crystallization peak heat quantity due to the crystallization is preferably less than 3 J/g, more preferably less than 2 J/g, even more preferably less than 1 J/g, and yet more preferably zero crystallization peak heat quantity. A polymer having substantially no crystallization peak resulting from the polymer block (B) in the −20 to 80° C. range in a differential scanning calorimetry (DSC) chart is likely to provide an asphalt composition having, in particular, a favorable high-temperature storage stability and elongation. Such a polymer having substantially no crystallization peak resulting from the polymer block (B) in the −20 to 80° C. range can be obtained, for example, by hydrogenating a base non-hydrogenated polymer obtained by performing a polymerization reaction using an adjuster for adjusting the amount of vinyl bonds and an adjuster for adjusting the random-polymerization characteristics of a conjugated diene and a vinyl aromatic compound.

The crystallization peak temperature and the crystallization peak heat quantity can be measured using a differential scanning calorimeter.

In the present embodiment, the production method in the case of hydrogenating the base non-hydrogenated polymer is not particularly limited, and known methods are usable.

The hydrogenation catalyst used when hydrogenating the base non-hydrogenated polymer is not particularly limited and, examples thereof include conventionally known catalysts such as (1) supported heterogeneous hydrogenation catalysts in which metals such as Ni, Pt, Pd, and Ru are supported on carbon, silica, alumina, and diatomaceous earth, (2) so-called Ziegler hydrogenation catalysts in which transition metal salts such as organic acid salts or acetylacetone salts of Ni, Co, Fe, Cr, and the like are used in combination with reducing agents such as organoaluminum, and (3) homogenous hydrogenation catalysts, e.g., so-called organometallic complexes such as organometallic compounds of Ti, Ru, Rh, and Zr.

As specific hydrogenation catalysts, catalysts described in Japanese Patent Publication No. 63-4841, Japanese Patent Publication No. 1-53851, and Japanese Patent Publication No. 2-9041 are usable, but hydrogenation catalysts are not limited thereto. Preferable hydrogenation catalysts include titanocene compounds and/or mixtures of such compounds and reducing organometallic compounds.

As titanocene compounds, compounds described in Japanese Patent Laid-Open No. 8-109219 are usable, and specific examples thereof include, but are not limited to, compounds having at least one ligand with a (substituted) cyclopentadienyl skeleton such as bis(cyclopentadienyl)titanium dichloride and mono(pendamethylcyclopentadienyl) titanium trichloride, an indenyl skeleton, or a fluorenyl skeleton.

Examples of reducing organometallic compounds include, but are not limited to, organoalkali metal compounds such as organolithiums, organomagnesium compounds, organoaluminum compounds, organoboron compounds, organozinc compounds, or the like.

The temperature conditions of the hydrogenation reaction of the base non-hydrogenated polymer are not particularly limited, and the hydrogenation reaction is usually performed in a temperature range of 0 to 200° C. and preferably 30 to 150° C. The pressure of hydrogen used in the hydrogenation reaction is not particularly limited, and it is usually 0.1 MPa or more and 15 MPa or less, preferably 0.2 MPa or more and 10 MPa or less, and more preferably 0.3 MPa or more and 5 MPa or less. The time of the hydrogenation reaction is not particularly limited, and is usually 3 minutes to 10 hours and preferably 10 minutes to 5 hours. The hydrogenation reaction can be performed in a batch process, a continuous process, or a combination of these.

As for the solution of the hydrogenated polymer obtained as described above, catalyst residues are removed as necessary, and the hydrogenated polymer can be separated from the solution. Possible examples of methods for separating the solvent include, but are not limited to, a method in which a polar solvent such as acetone or alcohol, which is a poor solvent for the hydrogenated polymer or the like, is added to the post-hydrogenation solution to recover the polymer as precipitates; a method in which the reaction solution is introduced into boiling water under stirring to remove the solvent by steam stripping and recover the polymer; a method in which the polymer solution is directly heated to remove the solvent by distillation; or the like. Various stabilizers such as phenolic stabilizers, phosphorous stabilizers, sulfuric stabilizers, and amine stabilizers can be added to the polymer of the present embodiment.

In the hydrogenation process, the conjugated bond of a vinyl aromatic monomer unit may be hydrogenated. The hydrogenation rate of conjugated bonds in all vinyl aromatic monomer units is preferably 30 mol % or less, more preferably 10 mol % or less, and even more preferably 3 mol % or less. Moreover, the lower limit of the hydrogenation rate of conjugated bonds in all vinyl aromatic monomers is not particularly limited, and is 0 mol %. When the hydrogenation rate of conjugated bonds in all vinyl aromatic monomers is within the above range, the dispersibility of the asphalt composition is likely to be more increased.

In the present embodiment, examples of methods for adjusting the bulk density and the specific surface area of the polymer include methods as described below.

<Process for Obtaining Aqueous Slurry>

After a polymer solution is obtained, catalyst residues are removed as necessary, subsequently the polymer solution is introduced into boiling water under stirring, the solvent is removed by steam stripping, and thereby an aqueous slurry in which the polymer is dispersed in water is obtained.

The processing method in steam stripping is not particularly limited, and conventionally known methods can be employed. An additive may be used during steam stripping. Examples of the additive commonly used include, but not limited to, anionic surfactants, cationic surfactants, and nonionic surfactants. The additive is generally added in an amount of 0.1 ppm or more and 3,000 ppm or less based on water in the stripping zone. In addition to the additive, water soluble salts of metals such as Li, Na, K, Mg, Ca, Al, and Zn are also usable as dispersion aids for the polymer.

<Process for Recovering Polymer>

The aqueous slurry obtained by the steam stripping process, in which polymer crumbs are dispersed in water, are subjected to dehydration and drying treatments through the following process, and thereby the polymer of the present embodiment can be recovered.

Although the polymer recovery process is not limited to the following process, the polymer recovery process can be performed, for example, through <process 1> dehydration treatment, <process 2> dehydration treatment and drying treatment, and <process 3> drying treatment, which will be described below. In <process 2>, the dehydration treatment and the drying treatment may be respectively performed with apparatuses that are independent from each other, or may be performed with a so-called integrated extrusion dryer equipped with dehydration treatment means and drying treatment means that are in communication with each other.

<Process 1>

The aqueous slurry is subjected to dehydration treatment to obtain a polymer which has a moisture content of more than 60% by mass and 80% by mass or less and in which the proportion of polymer components that do not pass through a sieve having a mesh size of 3.35 mm is 60% by mass or more based on the entire polymer. The moisture content of the polymer after <process 1> is preferably 62% by mass or more and 80% by mass and less, and more preferably 65% by mass or more and 75% by mass or less. Moreover, after <process 1>, the proportion of polymer components that do not pass through a sieve having a mesh size of 3.35 mm is preferably 70% by mass or more, and more preferably 80% by mass or more, based on the entire polymer.

Such dehydration treatment in <process 1> can be performed, for example, with a rotary screen, a vibrating screen, a centrifugal dehydrator, or the like.

When the moisture content of the resulting polymer exceeds 60% by mass, a decrease of the polymer flowability in an extruder in <process 2>, which will be described below, is likely to be suppressed. Moreover, when the moisture content is 80% by mass or less, heat load on the polymer is likely to be reduced in the extruder in <process 2>, which will be described below.

Furthermore, when the polymer components that do not pass through a sieve having a mesh size of 3.35 mm account for 60% by mass or more, it is likely that the dehydration and drying treatments in <process 2>, which will be described below, can be stably performed, and the desired bulk density and specific surface area of the hydrogenated polymer are efficiently obtained.

<Process 2>

The polymer, which has undergone dehydration treatment by <process 1> to have a predetermined moisture content, is subjected to dehydration treatment and drying treatment in <process 2> to be a polymer having a moisture content of 3% by mass or more and 30% by mass or less, and advances to <process 3>, which will be described below.

The moisture content of the polymer that has undergone <process 2> is preferably 3% by mass or more and 25% by mass or less, and more preferably 3.2% by mass or more and 20% by mass or less.

The aforementioned so-called integrated extrusion dryer equipped with dehydration treatment means and drying treatment means that are in communication with each other may be used.

The extrusion dryer is an apparatus that performs dehydration treatment and drying treatment and that is equipped with dehydration treatment means and drying treatment means. An extruder (an extruder-type water press) is employed as the dehydration treatment means, and a kneader-type dryer, a screw-type expander dryer, or the like is employed as the drying treatment means. In particular, an apparatus configured to be equipped with a uniaxial or polyaxial, e.g., biaxial, screw-type extruder as the dehydrating treatment means and equipped with a screw-type dryer as the drying treatment means is preferable from the viewpoint of dehydration efficiency and workability.

When the die diameter of the apparatus for performing drying treatment is 2 to 7 mm, the desired bulk density, specific surface area, and crumb size of the hydrogenated copolymer are likely to be efficiently obtained. From the viewpoint of reducing the amount of components (crumb size) that pass through a sieve having a mesh size of 3.35 mm and do not pass through a sieve having a mesh size of 0.425 mm based on the total amount of crumbs and, in particular, from the viewpoint of adjusting the amount of components that pass through a sieve having a mesh size of 3.35 mm and do not pass through a sieve having a mesh size of 0.425 mm to less than 80% by mass based on the total amount of crumbs or adjusting the specific surface area to 0.10 m²/g or more and less than 0.30 m²/g, the die diameter is preferably 2 mm or more, more preferably 3 mm or more, even more preferably 4 mm or more, and yet more preferably 6 mm or more. Moreover, from the viewpoint of increasing the amount of the aforementioned components (the amount of components having the desired crumb size), the die diameter is preferably 7 mm or less, more preferably 6 mm or less, even more preferably 5 mm or less, and yet more preferably 4 mm or less.

Moreover, with the resin pressure at that time being 3 to 5 MPa, the desired specific surface area and crumb size of the hydrogenated copolymer are likely to be efficiently obtained. From the viewpoint of reducing the specific surface area and the crumb size, the resin pressure is preferably 5 MPa or less, more preferably 4.5 MPa or less, even more preferably 4.0 MPa or less, and yet more preferably 3.5 MPa or less. Moreover, from the viewpoint of increasing the specific surface area and the crumb size, the resin pressure is preferably 3 MPa or more, more preferably 3.5 MPa or more, even more preferably 4.0 MPa or more, and yet more preferably 4.5 MPa or more.

Moreover, in the case where the weight average molecular weight is less than 200,000 in particular, adjusting the die diameter and the resin pressure as described above is likely to result in a polymer having a specific surface area of 0.30 m²/g or more and 0.60 m²/g or less.

Moreover, the dehydration apparatus and the drying apparatus, furthermore, the extrusion dryer in which dehydration treatment means and drying treatment means are integrated, and, specifically, a screw-type extruder, a screw-type dryer, an integrated screw extruder-type dryer, and the like for performing <process 2> may each be equipped with a vent mechanism and a dehydration slit depending on the intended use.

With the moisture content of the polymer being 3% by mass or more through <process 2>, the gelation and/or the degradation of the polymer caused by the shearing force of an extruder is likely to be effectively prevented. Moreover, with the moisture content being 30% by mass or less, controlling the moisture content of the resulting polymer to 1% by mass or less through <process 3>, which will be described below, is likely to be facilitated.

In the case of performing dehydration treatment and drying treatment respectively with separate apparatuses in <process 2>, it is preferable that the discharge port temperature of the apparatus for performing dehydration treatment is 120° C. or less, and the discharge port temperature of the apparatus for performing drying treatment is 135° C. or more and 175° C. or less. It is more preferable that the discharge port temperature of the apparatus for performing dehydration treatment is 120° C. or less, and the discharge port temperature of the apparatus for performing drying treatment is 138° C. or more and 172° C. or less, and it is even more preferable that the discharge port temperature of the apparatus for performing dehydration treatment is 118° C. or less, and the discharge port temperature of the apparatus for performing drying treatment is 140° C. or more and 172° C. or less.

In the case of treatment with an extrusion dryer having a so-called two-stage configuration in which dehydration treatment means and drying treatment means are integrated, it is preferable that the discharge port temperature of the first stage is 120° C. or less, and the discharge port temperature of the second stage is 135° C. or more and 175° C. or less. It is more preferable that the discharge port temperature of the first stage is 120° C. or less, and the discharge port temperature of the second stage is 138° C. or more and 172° C. or less, and it is even more preferable that the discharge port temperature of the first stage is 118° C. or less and that the discharge port temperature of the second stage is 140° C. or more and 172° C. or less.

When the temperatures are set at the above ranges, it is likely that dehydration treatment and drying treatment can be stably performed, and the desired bulk density and specific surface area of the hydrogenated polymer is efficiently obtained.

<Process 3>

Drying treatment is performed with a hot-air dryer or the like on the polymer obtained in <process 2> to obtain a polymer having a moisture content of 1% by mass or less.

That is to say, the moisture content of the polymer that has undergone <process 3> is preferably 1% by mass or less, more preferably 0.95% by mass or less, and even more preferably 0.9% by mass or less.

As described above, an aqueous slurry is subjected to dehydration treatment through <process 1> to obtain a polymer which has a moisture content of more than 60% by mass and 80% by mass or less and in which the proportion of polymer components that do not pass through a sieve having a mesh size of 3.35 mm is 60% by mass or more based on the entire polymer, then dehydrating treatment and drying treatment are performed through <process 2> to obtain a polymer having a moisture content of 3% by mass or more and 30% by mass or less, and, further, drying treatment is performed with a hot-air dryer through <process 3>, thereby making it possible to adjust the moisture content of the polymer to 1% by mass or less.

The moisture content and the size of the polymer can be determined by the methods described in the Examples provided below.

By adjusting the size and the moisture content of the polymer through <process 1> and, furthermore, adjusting the temperatures of the discharge ports in an apparatus and the moisture content of the polymer at the discharge ports through <process 1> to <process 3>, it is likely that the flowability of the polymer is increased, and a polymer foamed to a suitable extent (i.e., having a large specific surface area) is obtained. Furthermore, it is likely that flow with pulsation in the apparatus is suppressed, and a uniform polymer is obtained in which the amounts of the polymer in the form of a fine powder and the polymer having a large diameter are small.

The polymer of the present embodiment has a bulk density of 0.05 g/mL or more and 0.45 g/mL or less and a specific surface area of 0.05 m²/g or more and 0.6 m²/g or less.

In order to obtain such a polymer, it is particularly effective to adjust the size and the moisture content of a polymer that is before being subjected to <process 2> and optimize the dehydration and drying conditions of <process 2>.

When the moisture content of the polymer that has undergone <process 1> exceeds 60% by mass, it is likely that a decrease of flowability resulting from excessive dehydration in <process 2> can be effectively prevented. On the other hand, when the moisture content is 80% by mass or less, it is likely that polymer components having such a polymer size that they do not pass through a sieve having a mesh size of 3.35 mm can be sufficiently secured, dehydration and drying treatments in <process 2> can be stably performed, and, as a result, a favorable flowability is attained.

Moreover, an excessive moisture content of crumbs in <process 2> is likely to result in a large load in <process 3>, and an excessively small moisture content of the polymer is likely to result in a poor flowability of the polymer. Accordingly, from the viewpoint of uniform foaming to provide a uniform polymer, it is preferable to suitably adjust the moisture content in <process 2>. Furthermore, since excessive drying is likely to result in a poor flowability of the polymer, it is preferable that the temperature of the discharge port of the apparatus in drying treatment in <process 2> is 135° C. or more and 175° C. or less, from the viewpoint of uniform foaming to have a uniform polymer size.

From the above viewpoints, it is preferable that, in <process 1>, the moisture content of the polymer is adjusted to more than 60% by mass and 80% by mass or less, and the proportion of polymer components that do not pass through a sieve having a mesh size of 3.35 mm is 60% by mass or more based on the entire polymer, and, in <process 2>, the moisture content of the polymer is controlled to 3% by mass or more and 30% by mass or less.

Moreover, it is preferable that in the polymer of the present embodiment eventually obtained through the above processes, the proportion of components that pass through a sieve having a mesh size of 3.35 mm and do not pass through a sieve having a mesh size of 0.425 mm is 80% by mass or more based on the total amount of crumbs.

<Asphalt Composition>

The asphalt composition of the present embodiment comprises the polymer of the present embodiment and asphalt. Furthermore, in the asphalt composition of the present embodiment, the proportion of the polymer blended is 0.5 parts by mass or more and 50 parts by mass or less, preferably 1 part by mass or more and 30 parts by mass or less, and more preferably 2 parts by mass or more and 20 parts by mass or less, based on 100 parts by mass of asphalt. In the case where the proportion of the polymer blended is 0.5 parts by mass or more, a favorable softening point and a favorable rubber elasticity are likely to be obtained, and in the case of 50 parts by mass or less, the balance between physical properties and viscosity (workability) is likely to be favorable.

<Asphalt>

Examples of asphalt usable in the present embodiment include by-products during petroleum refining (petroleum asphalt), those obtained as natural products (natural asphalt), mixtures of such asphalt with petroleums, and the like. The main component thereof is what is referred to as bitumen. Specifically, asphalt includes straight asphalt, semi-blown asphalt, blown asphalt, tar, pitch, oil-added cutback asphalt, asphalt emulsion, and the like. These may be used as a mixture.

Suitable asphalt is straight asphalt preferably having a penetration (measured in accordance with JIS-K 2207) of 30 (1/10 mm) or more and 300 (1/10 mm) or less, more preferably 40 (1/10 mm) or more and 200 (1/10 mm) or less, and even more preferably 45 (1/10 mm) or more and 150 (1/10 mm) or less.

In the present embodiment, any petroleum resin can be further blended as necessary. Examples of the usable petroleum resin include, but not particularly limited to, aliphatic petroleum resins such as C5 petroleum resins, aromatic petroleum resins such as C9 petroleum resins, alicyclic petroleum resins such as dicyclopentadiene petroleum resins, petroleum resins such as C5/C9 copolymer petroleum resins, and hydrogenated petroleum resins obtained by hydrogenating such petroleum resins. The amount of petroleum resin is not particularly limited, and is preferably 1 part by mass or more and 10 parts by mass or less, and more preferably 2 parts by mass or more and 6 parts by mass or less, based on 100 parts by mass of asphalt.

In the present embodiment, any additive can be further blended as necessary. Additives are not particularly limited as long as they are commonly used for thermoplastic resins and rubber polymers. Examples of additives include, but are not limited to, those described in "Chemicals for Rubber/Plastics" (by Rubber Digest, Co., Ltd., Japan) and the like, e.g., inorganic fillers such as calcium carbonate, magnesium carbonate, magnesium hydroxide, calcium sulfate, barium sulfate, silica, clay, talc, mica, wollastonite, montmorillonite, zeolite, alumina, titanium oxide, magnesium oxide, zinc oxide, slug wool, and glass fibers; pigments such as carbon black and iron oxide; lubricants and mold release agents such as stearic acid, behenic acid, zinc stearate, calcium stearate, magnesium stearate, and ethylenebisstearamide; softening agents/plasticizers such as paraffinic process oils, naphthenic process oils, aromatic process oils, paraffins, organic polysiloxanes, and mineral oils; antioxidants such as hindered phenol antioxidants and phosphorous heat stabilizers; hindered amine light stabilizers; benzotriazole ultraviolet light absorbers; flame retardants; antistatic agents; reinforcements such as organic fibers, glass fibers, carbon fibers, and metal whiskers; colorants; other additives; or mixtures thereof. The amount of additive is not particularly limited and can be suitably selected, and is usually 50 parts by mass or less based on 100 parts by mass of asphalt.

In addition to the polymer of the present embodiment, other polymer can be also blended with the asphalt composition of the present embodiment. Examples of the other polymer include, but are not limited to, olefinic elastomers such as natural rubber, polyisoprene rubber, polybutadiene rubber, styrene-butadiene rubber, and ethylene-propylene copolymer; olefinic polymers such as chloroprene rubber, acrylic rubber, ethylene-vinyl acetate copolymer, ethylene-ethyl acrylate copolymer, atactic polypropylene, and amorphous poly-alpha-olefin, blends of polypropylene and ethylene-propylene copolymer, blends of polypropylene and ethylene-propylene-diene terpolymer, and olefinic thermoplastic elastomers that are copolymers of ethylene. These may be used singly or in combination.

From the viewpoint of increasing the heat aging resistance and the softening point, it is preferable to use an olefinic polymer and the other polymer in combination. In particular, it is more preferable to use an olefinic polymer at least having a propylene unit. The amount of the other polymer added is preferably 5 to 40 parts by mass based on 100 parts by mass of the polymer of the present embodiment.

In addition to those described above, it is preferable to use block copolymer (a) having at least one polymer block (A') comprising a vinyl aromatic monomer unit as a main component and at least one polymer block (C) comprising a conjugated diene monomer unit as a main component. Specific examples of the block copolymer (a) are not particularly limited and are preferably SIS, SBS, SEBS, and SEPS. Among these, SBS is preferable in terms of favorable low-temperature elongation.

Here, the phrase "comprising a conjugated diene monomer unit as a main component" means that the conjugated diene monomer unit is contained in an amount exceeding 90% by mass and preferably contained in an amount of 95% by mass or more in the polymer block. The upper limit is not particularly limited, and is preferably 100% by mass or less and preferably 99% by mass or less.

In another aspect of the asphalt composition of the present embodiment, the proportion of the polymers blended is 0.5 parts by mass or more and 50 parts by mass or less as the total amount of the polymer of the present embodiment and the block copolymer (a) based on 100 parts by mass of asphalt. That is to say, the asphalt composition according to another aspect of the present embodiment comprises asphalt and a mixture comprising the polymer of the present embodiment and the block copolymer (a), wherein the block copolymer (a) has at least one polymer block (A') comprising a vinyl aromatic monomer unit as a main component and at least one polymer block (C) comprising a conjugated diene monomer unit as a main component, the content of the mixture is 0.5 parts by mass or more and 50 parts by mass or less based on 100 parts by mass of the asphalt, and the content of the block copolymer (a) in the mixture is 15 to 85% by mass.

From the viewpoint of economy, the proportion of the polymers blended is preferably 0.5 parts by mass or more and 20 parts by mass or less, and more preferably 0.5 parts by mass or more and 15 parts by mass or less, based on 100 parts by mass of asphalt.

Moreover, in terms of a favorable low-temperature elongation, the content of the block copolymer (a) in the mixture of the polymer of the present embodiment and the block copolymer (a) is in the range of 15 to 85% by mass. Moreover, from the viewpoint of a favorable low-temperature performance and a lowered viscosity, the amount of the block copolymer (a) blended is preferably 30% by mass or more, more preferably 50% by mass or more, even more preferably 65% by mass or more, and yet more preferably 75% by mass or more. Moreover, from the viewpoint of an increased softening point and post-stretching modulus, the content of the block copolymer (a) in the mixture is preferably 75% by mass or less, more preferably 60% by mass or less, even more preferably 45% by mass or less, and yet more preferably 35% by mass or less.

Moreover, examples of the structure of the block copolymer (a) include, but are not limited to, structures represented by the following formulae (i) to (vi).

$(A\text{-}B)_n$            (i)

$B\text{-}(A\text{-}B)_n$            (ii)

$A\text{-}(B\text{-}A)_n$            (iii)

$A\text{-}(B\text{-}A)_n\text{-}X$            (iv)

$[(A\text{-}B)_k]_m\text{-}X$            (v)

$[(A\text{-}B)_k\text{-}A]_m\text{-}X$            (vi)

(In the above formulae (i) to (vi), A represents a block comprising a vinyl aromatic monomer unit as a main component; B represents a block comprising a conjugated diene monomer unit as a main component; X represents a residue of a coupling agent or a residue of a polymerization initiator such as polyfunctional organolithium; and m, n, and k each represent an integer of 1 or greater. Here, m, n, and k are each preferably an integer of 1 to 5.)

Examples of the coupling agent or the polymerization initiator such as polyfunctional organolithium include, but are not limited to, silicon tetrachloride, tin tetrachloride, epoxidized soybean oil, polyhalogenated hydrocarbon compounds, carboxylic ester compounds, polyvinyl compounds, bisphenol epoxy compounds, epoxy compounds, alkoxysilane compounds, halogenated silane compounds, and ester compounds.

In the present embodiment, the block copolymer (a) may be a mixture of a coupling form in which X is a residue of a coupling agent, and a non-coupling form in which X is absent or X is a residue of a polymerization initiator.

Moreover, it is preferable that the block copolymer (a) has a styrene content of 20 to 50% by mass, an amount of vinyl bonds of 8 to 60% by mass, and a weight average molecular weight in terms of polystyrene of 100,000 to 500,000.

Furthermore, in terms of the high softening point and high post-stretching modulus of the asphalt composition, the above formulae (v) and (vi) in which m is 2 or greater are more preferable.

Moreover, it is preferable to impart a functional group to the polymer of the present embodiment in the case where it is necessary to increase the softening point of the asphalt composition, improve the resistance of the asphalt composition to adhering to an aggregate, increase the flow rutting resistance of an asphalt mixture (a mixture comprising the asphalt composition and an aggregate), and increase abrasion resistance. That is to say, it is preferable that the polymer of the present embodiment has a functional group. An example of a modification method for imparting a functional group may include a method in which an addition reaction is performed to add a modifying agent that generates a functional-group-containing atomic group to the living terminal of the polymer.

Oxygen, nitrogen, phosphorus, sulfur, tin, or silicon is particularly preferable as an element contained in the functional group.

At least one selected from the group consisting of a hydroxyl group, an acid anhydride group, an epoxy group, an amino group, a silanol group, and an alkoxysilane group is particularly preferable as a specific functional group.

Some modifying agents, which can impart a branched structure to the polymer by the modification reaction, also function as the above coupling agent.

Moreover, from the viewpoint of flow rutting resistance, it is preferable to have a nitrogen-containing functional group. It is more preferable that the functional group is contained in an amount of 2 to 4 mol % in one molecule. It is further preferable that a nitrogen-containing functional group and an oxygen-containing functional group are both contained.

Examples of the modifying agent include, but are not limited to, tetraglycidylmetaxylenediamine, tetraglycidyl-1,3-bisaminomethylcyclohexane, tetraglycidyl-p-phenylenediamine, tetraglycidyldiaminodiphenylmethane, diglycidylaniline, γ-caprolactone, γ-glycidoxyethyltrimethoxysilane, γ-glycidoxypropyltrimetoxysilane, γ-glycidoxypropyltriphenoxysilane, γ-glycidoxypropylmethyldimethoxysilane, γ-glycidoxypropyldiethylethoxysilane, γ-glycidoxypropyldimethylethoxysilane, γ-glycidoxypropylmethyldiisopropeneoxysilane, bis(γ-glycidoxypropyl)dimethoxysilane, bis(γ-glycidoxypropyl)diethoxysilane, β-(3,4-epoxycyclohexyl)ethyl-tripropoxysilane, β-(3,4-epoxycyclohexyl)ethyl-tributoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, 1,3-dimethyl-2-imidazolidinone, 1,3-diethyl-2-imidazolidinone, N,N'-dimethylpropyleneurea, and N-methylpyrrolidone.

The amount of the modifying agent used is not particularly limited, and the modifying agent is preferably used in an amount of 0.5 to 5 eq per equivalent of the living terminal of the polymer.

From the viewpoint of the balance between low viscosity and a high softening point, a radial polymer that contains a functional group is more preferable.

It is preferable to perform crosslinking in the case where it is necessary to increase the solubilities of the polymer of the present embodiment and the other polymer into asphalt, improve the resistance of the asphalt composition to adhering to an aggregate, increase the flow rutting resistance of the asphalt mixture, and increase abrasion resistance. Examples of the type of crosslinking agents include, but are not limited to, sulfur or sulfur compounds, phosphorous, organic peroxides, epoxies, isocyanates, resins, amines, metal chelates, and thiuram.

From these crosslinking agents, one may be used, or two or more may be used. Moreover, two or more from the same type may be used.

Examples of sulfur or sulfur compounds type that are usable include, but are not limited to, elemental sulfur, sulfur chloride, morpholine-disulfide, tetramethylthiuram-disulfide, selenium dimethyldithiocarbamate, 2-(4'-morpholinodithio)benzothiazole, 4,4'-dithiodimorpholine, and thioacetamide.

Examples of phosphorous type that are usable include, but are not limited to, phosphoric anhydride ($P_2O_5$), polyphosphoric acid, phosphorus oxytrichloride ($POCl_3$), phosphorus trichloride ($PCl_3$), phosphorus pentasulfide ($P_2S_5$), or the like.

Examples of organic peroxides type that are usable include, but are not limited to, tert-butyl hydroperoxide, 1,1,3,3-tetramethylbutyl hydroperoxide, cumene hydroperoxide, diisopropylbenzene hydroperoxide, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 2,5-dimethyl-2,5-di(benzoylperoxy)hexane, 1,1-bis(tert-butylperoxy)-3,3,5-trimethylcyclohexane, n-butyl-4,4-bis(tert-butylperoxy)valerate, benzoyl peroxide, and tert-butylperoxy isobutyrate.

Examples of epoxies type that are usable include, but are not limited to, ethylene/n-butyl acrylate/glycidyl methacrylate (glycidyl methacrylate), neopentyl glycol diglycidyl ether, hexanediol diglycidyl ether, trimethylolpropane polyglycidyl ether, and diglycidyl hexahydrophthalate.

Examples of isocyanates type that are usable include, but are not limited to, triallyl isocyanurate, trimethylene diisocyanate, tetramethylene diisocyanate, pentamethylene diisocyanate, and hexamethylene diisocyanate.

Examples of resins type that are usable include, but are not limited to, alkylphenol-formaldehyde resins, and hexamethoxymethyl-melamine resins.

Examples of amines that are usable include, but are not limited to, hexamethylenediamine, triethylenetetramine, tetraethylenepentamine, hexamethylenediamine carbamate, N,N-dicinnamylidene-1,6-hexanediamine, 4,4-methylenebis(cyclohexylamine) carbamate, and 4,4-methylenebis(2-chloroaniline).

Examples of metal chelates type that are usable include, but are not limited to, zinc methacrylate, magnesium methacrylate, zinc dimethacrylate, and magnesium dimethacrylate.

Among the above crosslinking agents, sulfur, sulfuric compounds, and polyphosphoric acid are preferable in terms of exerting higher levels of the above effects as well as economy.

The amount of the cross-linking agent in the asphalt composition of the present embodiment is not particularly limited, and is preferably 0.03% by mass or more, more preferably 0.05% by mass or more, and even more preferably 0.10% by mass or more from the viewpoint of increasing the solubilities of the polymer of the present embodiment and the further polymer in asphalt, improving the resistance of the asphalt composition to adhering to an aggregate, increasing the flow rutting resistance of the asphalt mixture, and increasing abrasion resistance. On the other hand, from the viewpoint of suppressing the generation of toxic gas during production and from the viewpoint of economy, the amount is preferably 3% by mass or less, more preferably 1% by mass or less, even more preferably 0.5% by mass or less, and yet more preferably 0.3% by mass or less.

Furthermore, from the viewpoint of increasing the resistance of the asphalt composition to adhering to an aggregate, the flow rutting resistance, and abrasion resistance, preferable is a combination of a sulfur or sulfur compound, or polyphosphoric acid with a polymer having a radial structure in which 1,3-bis(N,N'-diglycidylaminomethyl)cyclohexane is used as a coupling agent.

Especially, it is preferable that the asphalt composition of the present embodiment further comprises sulfur or a sulfuric compound in an amount of 0.03 parts by mass or more and 3 parts by mass or less.

The asphalt composition of the present embodiment can be used in the road paving, roofing/waterproofing sheet, and sealant fields, and can be suitably used in the road paving field in particular. Especially, it is suitable for road paving.

The asphalt composition of the present embodiment can be formed into an asphalt mixture for road paving by being mixed with an appropriate aggregate. The mixing temperature is not particularly limited and is preferably 90° C. to 200° C. At a temperature of 90° C. or more, an aggregate and the asphalt composition are likely to be mixed more uniformly, and at a temperature of 200° C. or less, the degradation or the crosslinking of the asphalt composition is likely to be effectively prevented. In the present embodiment, in the case of preparing an asphalt mixture for road paving, such an asphalt mixture can be produced in paving mixture factories as with commonly used paving mixtures, and the mixing/stirring mixer used is not particularly limited, thus a continuous mixer and a batch mixer are both usable. As for an example of a mixing method, a favorable asphalt mixture can be produced merely by, first, introducing an aggregate heated to 90° C. to 200° C. into a mixer, dry-mixing the aggregate for 20 seconds to 30 seconds, then introducing the asphalt composition of the present embodiment that has been heated to the same temperature as the aggregate, and performing mixing for 40 to 60 seconds.

Needless to say, aggregates as set forth in "Manual for Asphalt Pavement" published by the Japan Road Association are applicable to the aggregate in the present embodiment, and, also, other aggregates can be mixed with the asphalt composition of the present embodiment irrespective of the material, such as various low-grade aggregates and recycled aggregates. Specific examples of aggregates that are usable include, but are not limited to, crushed stone, cobble stone, gravel, steel slag, and granular materials similar thereto such as artificial calcined aggregates, calcined foamed aggregates, artificial lightweight aggregates, ceramic grains, Luxabite, aluminum grains, plastic grains, ceramics, emery, construction debris, and fibers.

In general, aggregates are roughly classified into coarse aggregates, fine aggregates, and fillers. Coarse aggregates are aggregates that remain on a 2.36 mm sieve, and generally have varieties such as No. 7 crushed stone having a diameter range of 2.5 to 5 mm, No. 6 crushed stone having a diameter range of 5 to 13 mm, No. 5 crushed stone having a diameter range of 13 to 20 mm, and, further, No. 4 crushed stone having a diameter range of 20 to 30 mm. In the present embodiment, usable is one of these coarse aggregates having various diameter ranges, an aggregate in which two or more are mixed, or a synthesized aggregate. These coarse aggregates may be coated with straight asphalt in an amount of about 0.3 to 1% by mass based on the coarse aggregates.

Fine aggregates as used in the present embodiment refer to aggregates that pass through a 2.36 mm sieve and remain on a 0.075 mm sieve, and examples thereof include, but are not limited to, river sand, dune sand, pit sand, sea sand, crushed sand, fine sand, screenings, crushed stone dust, silica sand, artificial sand, glass cullet, foundry sand, and recycled aggregate crushed sand.

Moreover, fillers refer to those that pass through a 0.075 mm sieve, and examples thereof include, but are not limited to, filler portions of screenings, stone powder, slaked lime, cement, incinerator ash, clay, talc, fly ash, and carbon black. In addition, rubber particles, cork particles, wood particles, resin particles, fiber particles, pulp, artificial aggregates, and the like can even be used as fillers as long as they pass through a 0.075 mm sieve.

The particle size of the aggregate and the amount of the asphalt composition in the case of formulating an asphalt mixture for road paving may be determined, for example, in accordance with "Type and Particle Size Range of Asphalt Mixture" on page 92 of "Manual for Asphalt Pavement" published by the Japan Road Association on December 1992. In particular, it is preferable to formulate an asphalt mixture for road paving comprising 2 to 15% by mass of the asphalt composition and 85 to 98% by mass of the aggregate.

The polymer of the present embodiment can be suitably used also in a composition for asphalt waterproofing sheet. That is to say, the use of the polymer of the present embodiment makes it possible to improve the fatigue fracture resistance, weather resistance, crack resistance at low temperatures, shift resistance and dripping resistance at higher temperatures, and load resistance of asphalt waterproofing sheets.

In the case of preparing a composition for asphalt waterproofing sheet, the amount of the polymer of the present embodiment added is preferably larger than that of the asphalt composition for road paving from the viewpoint of increased flexibility, crack resistance at lower temperatures, shift resistance and dripping resistance at higher temperatures, and increased flex fatigue resistance, and weather resistance. Specifically, the proportion of the polymer is preferably 5% by mass or more, more preferably 7% by mass or more, and even more preferably 9% by mass or more, based on total 100% by mass of asphalt and the polymer. On the other hand, in terms of the producibility of the composition as well as economy, the proportion of the polymer is preferably 20% by mass or less, more preferably 17% by mass or less, and even more preferably 14% by mass or less.

In addition to the polymer of the present embodiment, various polymers, tackifiers, softening agents, antioxidants, anti-weathering agents, inorganic fillers, lubricants, mold release agents, and cross-linking agents can be used in the composition for asphalt waterproofing sheet as necessary.

In the case where an asphalt waterproofing sheet is installed at normal temperature and where it is necessary to increase the low-temperature usability and lower the viscosity of the composition for asphalt waterproofing sheet to increase installability, it is preferable to use asphalt having a high penetration. The penetration can be measured by the method described in the Examples provided below. As asphalt that has a high penetration, specifically, asphalt having a penetration of 80 or more is preferable, more preferably 100 or more, even more preferably 130 or more, and yet more preferably 160 or more.

In the case of installing an asphalt waterproofing sheet at a high temperature by a torch-applied method and the like, it is preferable to use asphalt having a lower penetration than in the case of installation at normal temperature so as not to excessively lower the viscosity of the composition for asphalt waterproofing sheet. Specifically, the penetration of asphalt in this case is preferably 30 (1/10 mm) or more and 150 (1/10 mm) or less, more preferably 60 (1/10 mm) or more and 120 (1/10 mm) or less, and even more preferably 80 or more and 100 or less.

It is preferable to use a softening agent in the case where it is necessary to increase the low-temperature usability of an asphalt waterproofing sheet and lower the viscosity of the composition for asphalt waterproofing sheet to increase installability. The softening agent is not particularly limited, and from the viewpoint of enhancing the above physical properties, oil is preferable, and process oil is more preferable.

Moreover, an inorganic filler may be used as necessary.

Examples of methods for installing an asphalt waterproofing sheet include, but are not limited to, a heat-welding method, a torch-applied method, a self-adhesive method, and a combined method. The composition for asphalt waterproofing sheet, in which the polymer of the present embodiment is used, is highly resistant to thermal aging and, therefore, can be suitably used for a heat-welding method and a torch-applied method.

The method for producing the asphalt composition of the present embodiment is not particularly limited. Moreover, the conditions when stirring a mixture of the polymer and asphalt are not particularly limited, and it is preferable to perform stirring at a temperature of 160° C. or more and 200° C. or less (usually around 180° C.) and the stirring time is preferably 30 minutes to 6 hours and more preferably 2 to 3 hours. The stirring speed is suitably selected according to the apparatus used, and is usually 100 ppm or more and 8,000 rpm or less.

EXAMPLES

Below, the present embodiment will be specifically described with reference to Examples, but the present embodiment is not at all limited to the Examples.

The measurement methods for polymers and asphalt compositions in Examples and Comparative Examples are as follows.

<Content of Vinyl Aromatic Monomer Unit (Styrene Content) in Polymer>

A specific amount of a polymer was dissolved in chloroform and subjected to measurement with a UV spectrophotometer (manufactured by Shimadzu Corporation, UV-2450) to calculate the content of a vinyl aromatic monomer unit (styrene) from the peak intensity of an absorption wavelength (262 nm) resulting from a vinyl aromatic compound (styrene) using a calibration curve.

<Content of Polymer Block (A) in Polymer>

Measurement was performed by the osmium tetroxide method described in I. M. Kolthoff, et al., J. Polym. Sci. 1, p. 429 (1946) using a polymer that was before hydrogenation. A 0.1 g osmic acid/125 mL tert-butanol solution was used for the decomposition of the polymer.

<Amount of Vinyl Bonds in Polymer, and Hydrogenation Rate of Double Bonds in Conjugated Diene Monomer Unit>

The amount of vinyl bonds in a polymer and the hydrogenation rate of double bonds in a conjugated diene monomer unit were measured by nuclear magnetic resonance spectrum analysis (NMR) under the following conditions.

The amount of vinyl bonds and the hydrogenation rate were both measured using a hydrogenated polymer sample. Large amounts of methanol were added to the post-hydrogenation reaction solution to allow the hydrogenated polymer to precipitate for recovery.

Then, the hydrogenated polymer was extracted with acetone, and the extract was vacuum-dried for use as a sample for 1H-NMR measurement.

The conditions of 1H-NMR measurement were as follows.
(Measurement Conditions)
Measurement instrument: JNM-LA400 (manufactured by JEOL Ltd.)
Solvent: Deuterated chloroform
Measuring samples: Polymer sampled before and after hydrogenation
Sample concentration: 50 mg/mL
Observation frequency: 400 MHz
Chemical shift reference: TMS (tetramethylsilane)
Pulse delay: 2.904 seconds
Number of scans: 64
Pulse width: 45°
Measurement temperature: 26° C.

<Peak Molecular Weight, Weight Average Molecular Weight, Molecular Weight Distribution>

Gel permeation chromatography (GPC) measurement was performed using a measurement apparatus manufactured by Waters. Tetrahydrofuran was used as a solvent, and the measurement temperature was 35° C. That is to say, the peak molecular weight, the weight average molecular weight (the molecular weight in terms of polystyrene), and the number average molecular weight were determined by finding the molecular weights of chromatogram peaks using a calibration curve determined from measurement on commercially available standard polystyrene (generated using the peak molecular weight of standard polystyrene). Moreover, the molecular weight distribution was determined from the ratio of the weight average molecular weight to the number average molecular weight.

<Bulk Density>

A 250 mL graduated cylinder was filled with 20 g of a polymer having a moisture content of 1% or less and allowed to freely fall 5 times from a height of 3 cm, and the subsequent volume of the polymer was measured to calculate the bulk density. For example, the calculated bulk density was 0.2 g/mL if the polymer had a volume of 100 mL.

<Specific Surface Area>

The specific surface area was calculated by the BET multipoint method using nitrogen adsorption (apparatus name: BELSORP-mini, manufactured by BEL Japan Inc.).

<Content of Short-Chain Vinyl Aromatic Monomer-Polymerized Moiety (Short-Chain Vinyl Content)>

Oxygen having an $O_3$ concentration of 1.5% was passed through a dichloromethane solution of a polymer at 150 mL/min for oxidative decomposition, and the resulting ozonide was reduced by being added dropwise to diethyl ether that had been mixed with lithium aluminum hydride.

Next, pure water was added dropwise for hydrolysis, potassium carbonate was added for salting-out, and filtration was performed to obtain a vinyl aromatic hydrocarbon component. This vinyl aromatic hydrocarbon component was subjected to GPC measurement. The area ratio of the resulting peak (the peak area corresponding to the short-chain vinyl aromatic monomer-polymerized moiety/the total peak area) was calculated to determine the content of the short-chain vinyl aromatic monomer-polymerized moiety in the polymer. Meanwhile, the ozone generator used was Model OT-31R-2 manufactured by Nippon Ozone Co., Ltd. GPC measurement was performed using a Waters 2487, chloroform as a solvent at a flow rate of 1.0 mL/min at a column oven temperature of 35° C., and 2 Shodex Column K803L columns connected to each other.

<Moisture Content in Crumb>

Heating was performed in a halogen moisture analyzer at 150° C. for 8 minutes to determine the decrease in mass, and the moisture content was calculated according to the following formula.

Moisture content (% by mass)=Decrease in mass through heating (amount of moisture contained in crumb)/Crumb mass before heating×100

<Crumb Size>

Using a sieve shaker (Octagon Digital, manufactured by Seishin Enterprise Co., Ltd.), a sieve having a mesh size of 3.35 mm was placed on top of a sieve having a mesh size of 0.425 mm, crumbs were introduced from above the sieve having a mesh size of 3.35 mm and shaken for 15 minutes, the amounts of crumbs that remained on the respective sieves and the amount of crumbs that passed through both sieves were measured to calculate the proportion (% by mass) of crumbs that did not pass through the sieve having a mesh size of 3.35 mm and the proportion (% by mass) of crumbs that had a crumb size of 0.425 to 3.35 mm. The proportion (% by mass) of crumbs that had a crumb size of 0.425 to 3.35 mm is indicated as "Particle size" in Table 1.

<Preparation of Hydrogenation Catalyst>

A nitrogen-purged reaction vessel was charged with 2 L of dried, purified cyclohexane to dissolve 40 mmol of bis(β5-cyclopentadienyl)titanium di-(p-tolyl) and 150 g of 1,2-polybutadiene having a molecular weight of about 1,000 (an amount of 1,2-vinyl bonds of about 85%), then a cyclohexane solution containing 60 mmol of n-butyllithium was added to perform a reaction at room temperature for 5 minutes, immediately 40 mmol of n-butanol was added and stirred, and the mixture was stored at room temperature.

<Polymer 1>

Polymerization was performed by the following method using a stirred jacketed tank reactor having an internal volume of 10 L.

After the reactor was charged with 10 parts by mass of cyclohexane and the temperature was adjusted to 70° C., 0.125% by mass of n-butyllithium was added based on the mass of all monomers (the total amount of the butadiene monomer and the styrene monomer introduced into the reactor), 0.4 mol of N,N,N',N'-tetramethylethylenediamine (hereinafter referred to as TMEDA) was added based on 1 mol of n-butyllithium, then a cyclohexane solution containing 11 parts by mass of styrene as a monomer (a monomer concentration of 22% by mass) was added over about 3 minutes, and a reaction was performed for 30 minutes while adjusting the inner temperature of the reactor to about 70° C.

Next, a cyclohexane solution containing 19 parts by mass of butadiene (a monomer concentration of 22% by mass) and a cyclohexane solution containing 21 parts by mass of styrene (a monomer concentration of 22% by mass) were each continuously supplied to the reactor over 6 minutes at a constant rate (hereinafter referred to as the first supply).

Then, a cyclohexane solution containing 38 parts by mass of butadiene (a monomer concentration of 22% by mass) was continuously supplied to the reactor over 20 minutes at a constant rate (hereinafter referred to as the second supply), and then a reaction was performed for 30 minutes. During this period, the inner temperature of the reactor was adjusted to about 70° C.

Then, a cyclohexane solution containing 11 parts by mass of styrene as a monomer (a monomer concentration of 22% by mass) was further added over about 3 minutes, and a reaction was performed for 30 minutes while adjusting the inner temperature of the reactor to about 70° C., to obtain a polymer.

Next, the aforementioned hydrogenation catalyst was added to the resulting polymer in a proportion of 90 ppm in terms of titanium based on the mass of the polymer, and a hydrogenation reaction was performed at a hydrogen pressure of 0.7 MPa at a temperature of 65° C. After the termination of the reaction, methanol was added, then 0.3% by mass of octadecyl-3-(3,5-di-t-butyl-4-hydroxyphenyl) propionate was added as a stabilizer based on the mass of the polymer to provide a hydrogenated polymer (a hydrogenation rate of 83%), the bulk density and the specific surface area were adjusted by the processes set forth in Table 2, and polymer 1 was thus obtained.

<Polymer 2>

Polymerization was performed by the same method as polymer 1 except for the following changes: 58 parts by mass of butadiene (19 parts by mass in the first supply and 39 parts by mass in the second supply) and 20 parts by mass of styrene were supplied to the second stage.

Next, a hydrogenation reaction was performed on the resulting polymer in the same manner as polymer 1 except that the hydrogenation catalyst was added in an amount of 100 ppm in terms of titanium based on the mass of the polymer to provide a hydrogenated polymer (a hydrogenation rate of 93%), then the bulk density and the specific surface area were adjusted by the processes set forth in Table 2, and polymer 2 was thus obtained.

<Polymer 3>

Polymerization was performed by the same method as polymer 1 except for the following changes: the amount of n-butyllithium supplied was 0.135% by mass, 0.3 mol of TMEDA was added, 19 parts by mass of styrene was supplied to the first stage, 45 parts by mass of butadiene (15 parts by mass in the first supply, and 30 parts by mass in the second supply) and 18 parts by mass of styrene were supplied to the second stage, the time of addition of the first supply was 5 minutes, the time of addition of the second supply was 15 minutes, the inner temperature of the reactor was 75° C., and 18 parts by mass of styrene was supplied to the third stage.

Next, a hydrogenation reaction was performed on the resulting polymer in the same manner as polymer 1 except that the hydrogenation catalyst was added in an amount of 85 ppm in terms of titanium based on the mass of the polymer to provide a hydrogenated polymer (a hydrogenation rate of 68%), then the bulk density and the specific surface area were adjusted by the processes set forth in Table 2, and polymer 3 was thus obtained.

<Polymer 4>

Polymerization was performed by the same method as polymer 1 except for the following changes: the amount of n-butyllithium supplied was 0.13% by mass, 0.2 mol of TMEDA was added, 13 parts by mass of styrene was supplied to the first stage, 54 parts by mass of butadiene (18 parts by mass in the first supply, and 36 parts by mass in the second supply) and 20 parts by mass of styrene were supplied to the second stage, the time of addition of the first supply was 10 minutes, the time of addition of the second supply was 15 minutes, the inner temperature of the reactor was 65° C., and 13 parts by mass of styrene was supplied to the third stage.

Next, a hydrogenation reaction was performed on the resulting polymer in the same manner as polymer 1 except that the hydrogenation catalyst was added in an amount of 85 ppm in terms of titanium based on the mass of the polymer to provide a hydrogenated polymer (a hydrogenation rate of 72%), then the bulk density and the specific surface area were adjusted by the processes set forth in Table 2, and polymer 4 was thus obtained.

<Polymer 5>

Polymerization was performed by the same method as polymer 1, and a polymer was thus obtained.

No hydrogenation reaction was performed (a hydrogenation rate of 0%), the bulk density and the specific surface area were adjusted by the processes set forth in Table 2, and polymer 5 was thus obtained.

<Polymer 6>

Polymerization was performed by the same method as polymer 1 except for the following changes: 21 parts by mass of styrene was supplied to the first stage, 52 parts by mass of butadiene (17 parts by mass in the first supply, and 35 parts by mass in the second supply), with the time of addition of the first supply being 5 minutes and the time of addition of the second supply being 25 minutes, and 6 parts by mass of styrene were supplied to the second stage, the inner temperature of the reactor was 65° C., and 21 parts by mass of styrene was supplied to the third stage.

Next, a hydrogenation reaction was performed on the resulting polymer in the same manner as polymer 1 except that the hydrogenation catalyst was added in an amount of 100 ppm in terms of titanium based on the mass of the polymer to provide a hydrogenated polymer (a hydrogenation rate of 96%), then the bulk density and the specific surface area were adjusted by the processes set forth in Table 2, and polymer 6 was thus obtained.

<Polymer 7>

Polymerization was performed by the same method as polymer 1 except for the following changes: the amount of n-butyllithium supplied was 0.135% by mass, 0.35 mol of TMEDA was added, 12 parts by mass of styrene was supplied to the first stage, 60 parts by mass of butadiene (20 parts by mass in the first supply, and 40 parts by mass in the second supply), with the time of addition of the first supply being 5 minutes and the time of addition of the second supply being 15 minutes, and 17 parts by mass of styrene were supplied to the second stage, the inner temperature of the reactor was 70° C., and 11 parts by mass of styrene was supplied to the third stage.

Next, a hydrogenation reaction was performed on the resulting polymer in the same manner as polymer 1 to provide a hydrogenated polymer (a hydrogenation rate of 80%), then the bulk density and the specific surface area were adjusted by the processes set forth in Table 2, and polymer 7 was thus obtained.

<Polymer 8>

Polymerization was performed by the same method as polymer 1 except for the following changes: 0.2 mol of TMEDA was added, 13 parts by mass of styrene was supplied to the first stage, 50 parts by mass of butadiene (16 parts by mass in the first supply, and 34 parts by mass in the second supply), with the time of addition of the first supply being 4 minutes and the time of addition of the second supply being 40 minutes, and 25 parts by mass of styrene were supplied to the second stage, and 12 parts by mass of styrene was supplied to the third stage.

Next, a hydrogenation reaction was performed on the resulting polymer in the same manner as polymer 1 to provide a hydrogenated polymer (a hydrogenation rate of 84%), then the bulk density and the specific surface area were adjusted by the processes set forth in Table 2, and polymer 8 was thus obtained.

<Polymer 9>

Polymerization was performed by the same method as polymer 1 except for the following changes: the amount of n-butyllithium supplied was 0.13% by mass, no TMEDA was added, 18 parts by mass of styrene was supplied to the first stage, 65 parts by mass of butadiene was supplied to the second stage without adding styrene, and 17 parts by mass of styrene was supplied to the third stage.

No hydrogenation reaction was performed (a hydrogenation rate of 0%), the bulk density and the specific surface area were adjusted by the processes set forth in Table 2, and polymer 9 was thus obtained.

<Polymer 10>

Polymerization was performed by the same method as polymer 1 except for the following changes: the amount of n-butyllithium supplied was 0.115% by mass, 12 parts by mass of styrene was supplied to the first stage, 54 parts by mass of butadiene (18 parts by mass in the first supply, and 36 parts by mass in the second supply) and 23 parts by mass of styrene were supplied to the second stage, and 11 parts by mass of styrene was supplied to the third stage.

Next, a hydrogenation reaction was performed on the resulting polymer in the same manner as polymer 1 except that the hydrogenation catalyst was added in an amount of 100 ppm in terms of titanium based on the mass of the polymer to provide a hydrogenated polymer (a hydrogenation rate of 90%), then the bulk density and the specific surface area were adjusted by the processes set forth in Table 2, and polymer 10 was thus obtained.

<Polymer 11>

Polymerization was performed by the same method as polymer 1 except for the following changes: n-butyllithium was 0.120% by mass based on the mass of all monomers (the total amount of butadiene monomers and styrene monomers introduced into the reactor), 21 parts by mass of styrene was supplied to the first stage, 52 parts by mass of butadiene (17 parts by mass in the first supply, and 35 parts by mass in the second supply), with the time of addition of the first supply being 5 minutes and the time of addition of the second supply being 25 minutes, and 6 parts by mass of styrene were supplied to the second stage, the inner temperature of the reactor was 65° C., and 20 parts by mass of styrene was supplied to the third stage.

Next, a hydrogenation reaction was performed on the resulting polymer in the same manner as polymer 1 except that the hydrogenation catalyst was added in an amount of 100 ppm in terms of titanium based on the mass of the polymer to provide a hydrogenated polymer (a hydrogenation rate of 96%), then the bulk density and the specific surface area were adjusted by the processes set forth in Table 2, and polymer 11 was thus obtained.

<Polymer 12>

Polymerization was performed by the same method as polymer 1 except for the following changes: 59 parts by mass of butadiene (20 parts by mass in the first supply, and 39 parts by mass in the second supply) and 20 parts by mass of styrene were supplied to the second stage, and 10 parts by mass of styrene was supplied to the third stage.

Then, 1,3-dimethyl-2-imidazolidinone was added so as to be 0.95 mol per mole of n-butyllithium, and reacted for 25 minutes.

Next, a hydrogenation reaction was performed in the same manner as polymer 1 to provide a hydrogenated polymer (a hydrogenation rate of 85%), then the bulk density and the specific surface area were adjusted by the processes set forth in Table 2, and polymer 12 was thus obtained.

<Polymer 13>

Polymerization was performed by the same method as polymer 1 except for the following changes: n-butyllithium was 0.105% by mass based on the mass of all monomers (the total amount of butadiene monomers and styrene monomers introduced into the reactor), 58 parts by mass of butadiene (20 parts by mass in the first supply, and 38 parts by mass in the second supply) and 21 parts by mass of styrene were supplied to the second stage, and 10 parts by mass of styrene was supplied to the third stage.

Next, a hydrogenation reaction was performed on the resulting polymer in the same manner as polymer 1 except that the hydrogenation catalyst was added in an amount of 80 ppm in terms of titanium based on the mass of the polymer to provide a hydrogenated polymer (a hydrogenation rate of 65%), then the bulk density and the specific surface area were adjusted by the processes set forth in Table 2, and polymer 13 was thus obtained.

<Polymer 14>

Polymerization was performed by the same method as polymer 1 except for the following changes: n-butyllithium was 0.115% by mass based on the mass of all monomers (the total amount of butadiene monomers and styrene monomers introduced into the reactor), and 58 parts by mass of butadiene (19 parts by mass in the first supply, and 39 parts by mass in the second supply) and 20 parts by mass of styrene were supplied to the second stage.

Next, a hydrogenation reaction was performed on the resulting polymer in the same manner as polymer 1 except that the hydrogenation catalyst was added in an amount of 100 ppm in terms of titanium based on the mass of the polymer to provide a hydrogenated polymer (a hydrogenation rate of 91%), then the bulk density and the specific surface area were adjusted by the processes set forth in Table 2, and polymer 14 was thus obtained.

<Polymer 15>

Polymerization was performed by the same method as polymer 1 except for the following changes: n-butyllithium was 0.120% by mass based on the mass of all monomers (the total amount of butadiene monomers and styrene monomers introduced into the reactor), and 59 parts by mass of butadiene (20 parts by mass in the first supply, and 39 parts by mass in the second supply) and 21 parts by mass of styrene were supplied to the second stage.

Next, a hydrogenation reaction was performed on the resulting polymer in the same manner as polymer 1 except that the hydrogenation catalyst was added in an amount of 100 ppm in terms of titanium based on the mass of the polymer to provide a hydrogenated polymer (a hydrogenation rate of 90%), then the bulk density and the specific surface area were adjusted by the processes set forth in Table 2, and polymer 15 was thus obtained.

<Polymer 16>

Polymerization was performed by the same method as polymer 1 except for the following changes: n-butyllithium was 0.090% by mass based on the mass of all monomers (the total amount of butadiene monomers and styrene monomers introduced into the reactor), and 59 parts by mass of butadiene (20 parts by mass in the first supply, and 39 parts by mass in the second supply) and 21 parts by mass of styrene were supplied to the second stage.

Next, a hydrogenation reaction was performed on the resulting polymer in the same manner as polymer 1 except that the hydrogenation catalyst was added in an amount of 100 ppm in terms of titanium based on the mass of the polymer to provide a hydrogenated polymer (a hydrogenation rate of 94%), then the bulk density and the specific surface area were adjusted by the processes set forth in Table 2, and polymer 16 was thus obtained.

<Polymers 17, 24, and 25>

A jacketed tank reactor was used and charged with a predetermined amount of cyclohexane, and the inner temperature of the reactor was adjusted to 60° C.

Then, n-butyllithium was added from the bottom part of the reactor so as to be 0.095 parts by mass based on 100 parts by mass of all monomers (the total amount of butadiene monomers and styrene monomers introduced into the reactor).

Furthermore, a cyclohexane solution of N,N,N',N'-tetramethylethylenediamine was added so as to be 0.35 mol per mole of n-butyllithium.

Then, for the polymerization reaction of the first step, a cyclohexane solution containing 10 parts by mass of styrene as a monomer (a monomer concentration of 15% by mass) was supplied over about 10 minutes, and the inner temperature of the reactor was adjusted to 65° C. After the termination of the supply, a reaction was performed for 15 minutes.

Next, for the polymerization reaction of the second step, a cyclohexane solution containing 59 parts by mass of butadiene (a monomer concentration of 15% by mass) and a cyclohexane solution containing 21 parts by mass of styrene (a monomer concentration of 15% by mass) were continuously supplied to the reactor over 60 minutes at a constant rate, and after the termination of the supply, a reaction was performed for 15 minutes.

Next, for the polymerization reaction of the third step, a cyclohexane solution containing 10 parts by mass of styrene (a monomer concentration of 15% by mass) was supplied over about 10 minutes, and the inner temperature of the reactor was adjusted to 65° C. After the termination of the supply, a reaction was performed for 15 minutes.

Next, the above hydrogenation catalyst was added to the resulting polymer in an amount of 100 ppm in terms of titanium based on the mass of the polymer, and a hydrogenation reaction was performed at a hydrogen pressure of 0.7 MPa at a temperature of 65° C.

After the termination of the reaction, an aqueous methanol solution was added and, next, octadecyl-3-(3,5-di-t-butyl-4-hydroxyphenyl)propionate as a stabilizer was added in an amount of 0.1% by mass based on the mass of the polymer. The bulk density and the specific surface area of the hydrogenated polymer obtained in this way were adjusted by the processes set forth in Table 2, and polymers 17, 24, and 25 were thus obtained.

<Polymer 18>

In the polymerization reaction of the second step, a cyclohexane solution containing 60 parts by mass of butadiene (a monomer concentration of 20% by mass) and a cyclohexane solution containing 20 parts by mass of styrene (a monomer concentration of 20% by mass) were supplied in 3 divided portions at intervals of 15 minutes.

Other conditions for performing polymerization and hydrogenation were the same as polymer 17, the bulk density and the specific surface area were adjusted by the processes set forth in Table 2, and polymer 18 was thus obtained.

<Polymer 19>

In the polymerization reaction of the second step, a cyclohexane solution containing 59 parts by mass of butadiene (a monomer concentration of 25% by mass) and a cyclohexane solution containing 21 parts by mass of styrene (a monomer concentration of 25% by mass) were entirely supplied at the beginning all together. Other conditions for performing polymerization and hydrogenation were the same as polymer 17, the bulk density and the specific surface area were adjusted by the processes set forth in Table 2, and polymer 19 was thus obtained.

<Polymer 20> n-Butyllithium was added from the bottom part of the reactor so as to be 0.070 parts by mass based on 100 parts by mass of all monomers (the total amount of butadiene monomers and styrene monomers introduced into the reactor), the polymerization temperature was 55° C., and in the polymerization reaction of the second step, a cyclohexane solution containing 52 parts by mass of butadiene (a monomer concentration of 15% by mass) and a cyclohexane solution containing 28 parts by mass of styrene (a monomer concentration of 15% by mass) were continuously supplied to the reactor over 80 minutes at a constant rate. Other conditions for performing polymerization and hydrogenation were the same as polymer 17, the bulk density and the specific surface area were adjusted by the processes set forth in Table 2, and polymer 20 was thus obtained.

<Polymers 21 and 22>

The polymerization temperature was 60° C., the amount of styrene was 11 parts by mass in the polymerization reaction of the first step and 11 parts by mass in the polymerization reaction of the third step, and in the polymerization reaction of the second step, a cyclohexane solution containing 57 parts by mass of butadiene (a monomer concentration of 15% by mass) and a cyclohexane solution containing 21 parts by mass of styrene (a monomer concentration of 15% by mass) were continuously supplied to the reactor over 60 minutes at a constant rate. Other conditions for performing polymerization were the same as polymer 17, the bulk density and the specific surface area were adjusted by the processes set forth in Table 2, and polymers 21 and 22 were thus obtained.

Hydrogenation was performed only on polymer 21 in the same manner as polymer 17, and no hydrogenation was performed on polymer 22.

<Polymer 23> n-Butyllithium was added so as to be 0.11 parts by mass based on 100 parts by mass of all monomers (the total amount of butadiene monomers and styrene monomers introduced into the reactor).

Moreover, in the polymerization reaction of the second step, a cyclohexane solution containing 60 parts by mass of butadiene (a monomer concentration of 15% by mass) and a cyclohexane solution containing 20 parts by mass of styrene (a monomer concentration of 15% by mass) were continuously supplied to the reactor over 60 minutes at a constant rate. Other conditions for performing polymerization and hydrogenation were the same as polymer 17, the bulk density and the specific surface area were adjusted by the processes set forth in Table 2, and polymer 23 was thus obtained.

<Polymer 26>

In the polymerization reaction of the second step, a cyclohexane solution containing 60 parts by mass of butadiene (a monomer concentration of 20% by mass) and a cyclohexane solution containing 21 parts by mass of styrene (a monomer concentration of 20% by mass) were supplied in 3 divided portions at intervals of 15 minutes. Next, for the polymerization reaction of the third step, a cyclohexane solution containing 9 parts by mass of styrene (a monomer concentration of 15% by mass) was supplied over about 10 minutes, and the inner temperature of the reactor was adjusted to 65° C. After the termination of the supply, a reaction was performed for 15 minutes. Then, 1,3-dimethyl-2-imidazolidinone was added so as to be 0.95 mol per mole of n-butyllithium, and reacted for 25 minutes.

Other conditions for performing polymerization and hydrogenation were the same as polymer 17, the bulk density and the specific surface area were adjusted by the processes set forth in Table 2, and polymer 26 was thus obtained.

<Polymer 27> n-Butyllithium was added so as to be 0.060 parts by mass based on 100 parts by mass of all monomers (the total amount of butadiene monomers and styrene monomers introduced into the reactor). The polymerization temperature was 60° C., the amount of styrene was 10 parts by mass in the polymerization reaction of the first step and 10 parts by mass in the polymerization reaction of the third step, and in the polymerization reaction of the second step, a cyclohexane solution containing 58 parts by mass of butadiene (a monomer concentration of 15% by mass) and a cyclohexane solution containing 22 parts by mass of styrene (a monomer concentration of 15% by mass) were continuously supplied to the reactor over 60 minutes at a constant rate. Other conditions for performing polymerization were the same manner as polymer 17, and a polymer was thus produced. Other conditions for performing polymerization and hydrogenation were the same as polymer 17, the bulk density and the specific surface area were adjusted by the processes set forth in Table 2, and polymer 27 was thus obtained.

Table 3 shows the reaction conditions in the operation for adjusting the content of short-chain vinyl aromatic monomer-polymerized moietys in the polymer block (B).

Polymers 1 to 27, which had undergone process 3, were confirmed to have a moisture content of 1% by mass or less.

TABLE 1

| Polymer | Styrene content (% by mass) | Content of polymer block (A) (% by mass) | Hydrogenation rate (mol %) | Amount of vinyl bonds (mol %) | Peak molecular weight (×10,000) | Mw (×10,000) | Mw/Mn | Bulk density (g/mL) | Specific surface area (m²/g) | Particle size (%) | Short-chain vinyl content (% by mass) |
|---|---|---|---|---|---|---|---|---|---|---|---|
| Polymer 1 | 43 | 22 | 83 | 29 | 19 | 17 | 1.1 | 0.27 | 0.18 | 49 | 91 |
| Polymer 2 | 42 | 22 | 93 | 32 | 19 | 17 | 1.1 | 0.33 | 0.20 | 67 | 95 |
| Polymer 3 | 55 | 37 | 68 | 31 | 16 | 14 | 1.1 | 0.27 | 0.19 | 66 | 73 |
| Polymer 4 | 46 | 26 | 72 | 21 | 18 | 16 | 1.1 | 0.25 | 0.21 | 70 | 47 |
| Polymer 5 | 43 | 22 | 0 | 31 | 19 | 17 | 1.1 | 0.26 | 0.18 | 36 | 92 |
| Polymer 6 | 48 | 42 | 96 | 32 | 19 | 17 | 1.1 | 0.28 | 0.20 | 81 | 93 |
| Polymer 7 | 40 | 23 | 80 | 26 | 16 | 14 | 1.1 | 0.50 | 0.30 | 55 | 82 |
| Polymer 8 | 50 | 25 | 84 | 22 | 19 | 17 | 1.1 | 0.50 | 0.31 | 60 | 48 |
| Polymer 9 | 35 | 35 | 0 | 20 | 18 | 16 | 1.1 | 0.30 | 0.23 | 63 | 0 |
| Polymer 10 | 46 | 23 | 90 | 29 | 20 | 19 | 1.1 | 0.33 | 0.62 | 88 | 90 |
| Polymer 11 | 47 | 41 | 96 | 31 | 20 | 18 | 1.1 | 0.29 | 0.04 | 90 | 90 |
| Polymer 12 | 41 | 21 | 85 | 30 | 18 | 17 | 1.1 | 0.26 | 0.20 | 70 | 90 |
| Polymer 13 | 42 | 21 | 65 | 31 | 23 | 21 | 1.1 | 0.29 | 0.20 | 60 | 92 |
| Polymer 14 | 42 | 22 | 91 | 30 | 19 | 17 | 1.1 | 0.26 | 0.43 | 30 | 90 |
| Polymer 15 | 42 | 21 | 90 | 31 | 19 | 17 | 1.1 | 0.28 | 0.40 | 88 | 90 |
| Polymer 16 | 42 | 21 | 94 | 30 | 24 | 22 | 1.1 | 0.21 | 0.50 | 34 | 90 |
| Polymer 17 | 41 | 20 | 99 | 29 | 19 | 17 | 1.21 | 0.31 | 0.45 | 60 | 94 |
| Polymer 18 | 40 | 20 | 95 | 28 | 19 | 17 | 1.21 | 0.29 | 0.43 | 55 | 78 |
| Polymer 19 | 41 | 20 | 97 | 29 | 19 | 17 | 1.21 | 0.31 | 0.45 | 68 | 47 |
| Polymer 20 | 48 | 20 | 96 | 29 | 23 | 22 | 1.04 | 0.27 | 0.51 | 82 | 88 |
| Polymer 21 | 43 | 22 | 83 | 29 | 18 | 17 | 1.10 | 0.36 | 0.40 | 47 | 91 |
| Polymer 22 | 43 | 22 | 0 | 31 | 19 | 17 | 1.10 | 0.38 | 0.38 | 28 | 92 |
| Polymer 23 | 40 | 20 | 99 | 26 | 16 | 14 | 1.04 | 0.50 | 0.08 | 88 | 88 |
| Polymer 24 | 41 | 20 | 99 | 29 | 19 | 17 | 1.21 | 0.38 | 0.09 | 90 | 94 |
| Polymer 25 | 41 | 20 | 99 | 29 | 19 | 17 | 1.21 | 0.15 | 0.58 | 70 | 94 |
| Polymer 26 | 40 | 19 | 95 | 28 | 19 | 17 | 1.19 | 0.30 | 0.43 | 53 | 79 |
| Polymer 27 | 42 | 20 | 97 | 31 | 24 | 22 | 1.11 | 0.21 | 0.50 | 33 | 91 |

TABLE 2

| | Process 1 | | Process 2 | | | | | |
|---|---|---|---|---|---|---|---|---|
| | Moisture content of crumbs (% by mass) | Crumb size Component not passing through 3.35 mm mesh (% by mass) | First-stage discharge port temperature (° C.) | Second-stage discharge port temperature (° C.) | Die diameter (mm) | Resin pressure (MPa) | Moisture content of crumbs at second-stage discharge port (% by mass) | Specific surface area (m²/g) |
| Polymer 1 | 75 | 85 | 94 | 165 | 6 | 3 | 5.9 | 0.18 |
| Polymer 2 | 67 | 80 | 100 | 170 | 5 | 3 | 4.4 | 0.20 |
| Polymer 3 | 75 | 80 | 102 | 140 | 6 | 3 | 6.0 | 0.19 |

TABLE 2-continued

|  | Process 1 | | Process 2 | | | | | |
|---|---|---|---|---|---|---|---|---|
|  | Moisture content of crumbs (% by mass) | Crumb size Component not passing through 3.35 mm mesh (% by mass) | First-stage discharge port temperature (° C.) | Second-stage discharge port temperature (° C.) | Die diameter (mm) | Resin pressure (MPa) | Moisture content of crumbs at second-stage discharge port (% by mass) | Specific surface area (m²/g) |
| Polymer 4 | 72 | 85 | 98 | 161 | 5 | 3 | 3.0 | 0.21 |
| Polymer 5 | 71 | 90 | 110 | 143 | 6 | 3 | 3.7 | 0.18 |
| Polymer 6 | 80 | 80 | 99 | 155 | 4 | 2.6 | 4.2 | 0.20 |
| Polymer 7 | 77 | 80 | 125 | 160 | 6 | 2.8 | 3.1 | 0.30 |
| Polymer 8 | 69 | 85 | 125 | 142 | 5 | 3.2 | 2.0 | 0.31 |
| Polymer 9 | 80 | 80 | 96 | 151 | 5 | 3 | 5.8 | 0.23 |
| Polymer 10 | 83 | 90 | 107 | 130 | 2 | 3.8 | 10 | 0.62 |
| Polymer 11 | 85 | 80 | 102 | 153 | 2 | 2.8 | 4.0 | 0.04 |
| Polymer 12 | 73 | 85 | 96 | 165 | 5 | 3 | 5.5 | 0.20 |
| Polymer 13 | 69 | 80 | 100 | 151 | 4 | 3 | 5.6 | 0.20 |
| Polymer 14 | 75 | 85 | 105 | 160 | 4 | 4 | 5.7 | 0.43 |
| Polymer 15 | 71 | 80 | 103 | 153 | 2 | 3.6 | 6.3 | 0.40 |
| Polymer 16 | 75 | 90 | 107 | 157 | 3 | 5 | 6.0 | 0.50 |
| Polymer 17 | 65 | 75 | 104 | 160 | 4 | 4.2 | 8.5 | 0.45 |
| Polymer 18 | 62 | 70 | 110 | 165 | 4 | 4 | 7.5 | 0.43 |
| Polymer 19 | 65 | 70 | 108 | 168 | 4 | 4.3 | 7.5 | 0.45 |
| Polymer 20 | 67 | 60 | 105 | 162 | 3 | 5.2 | 7 | 0.51 |
| Polymer 21 | 60 | 70 | 102 | 162 | 4 | 3.6 | 8 | 0.40 |
| Polymer 22 | 60 | 75 | 110 | 165 | 4 | 3.3 | 8.5 | 0.38 |
| Polymer 23 | 30 | 80 | 125 | 185 | 2 | 2.6 | 2 | 0.08 |
| Polymer 24 | 32 | 70 | 120 | 177 | 2 | 2.7 | 2.8 | 0.09 |
| Polymer 25 | 80 | 75 | 96 | 135 | 3 | 4.4 | 19.5 | 0.58 |
| Polymer 26 | 63 | 70 | 109 | 165 | 4 | 4 | 7.5 | 0.43 |
| Polymer 27 | 74 | 90 | 110 | 159 | 3 | 5 | 6.1 | 0.50 |

TABLE 3

|  | First supply Time of addition (min) | Second supply Time of addition (min) | Third supply Time of addition (min) | Inner temperature of reactor (° C.) |
|---|---|---|---|---|
| Polymer 1 | 6 | 20 | — | 70 |
| Polymer 2 | 6 | 20 | — | 70 |
| Polymer 3 | 5 | 15 | — | 75 |
| Polymer 4 | 10 | 15 | — | 65 |
| Polymer 5 | 6 | 20 | — | 70 |
| Polymer 6 | 5 | 25 | — | 65 |
| Polymer 7 | 5 | 15 | — | 65 |
| Polymer 8 | 4 | 40 | — | 70 |
| Polymer 9 | — | — | — | 70 |
| Polymer 10 | 6 | 20 | — | 70 |
| Polymer 11 | 5 | 25 | — | 70 |
| Polymer 12 | 6 | 20 | — | 70 |
| Polymer 13 | 6 | 20 | — | 70 |
| Polymer 14 | 6 | 20 | — | 70 |
| Polymer 15 | 6 | 20 | — | 70 |
| Polymer 16 | 6 | 20 | — | 70 |
| Polymer 17 | 60 | — | — | 65 |
| Polymer 18 | 15 | 15 | 15 | 65 |
| Polymer 19 | 0 | — | — | 65 |
| Polymer 20 | 80 | — | — | 65 |
| Polymer 21 | 60 | — | — | 65 |
| Polymer 22 | 60 | — | — | 65 |
| Polymer 23 | 60 | — | — | 65 |
| Polymer 24 | 60 | — | — | 65 |
| Polymer 25 | 60 | — | — | 65 |
| Polymer 26 | 15 | 15 | 15 | 65 |
| Polymer 27 | 60 | — | — | 65 |

<Preparation of Asphalt Composition>

In Examples and Comparative Examples, asphalt compositions were produced in the following manner. A 750 mL metal can was charged with 500 g of straight asphalt 60-80 (manufactured by Nippon Oil Corporation), and the metal can was sufficiently immersed in an oil bath at 180° C. Next, 3.5 parts by mass of a polymer shown in Tables 5 and 6 was added under stirring in small portions to 100 parts by mass of the molten asphalt. After complete addition, stirring was performed at a revolving speed of 6,000 rpm for 90 minutes, and the asphalt compositions of Examples 1 to 6, 11 to 18, and 22 to 25 and Comparative Examples 1 to 8 were thus prepared. Moreover, the asphalt compositions of Examples 26 to 30 and Comparative Examples 9 to 11 were prepared in the same manner as above except that the polymers shown in Table 7 were used in an amount of 8 parts by mass.

The asphalt compositions of Examples 7 and 8 were prepared in the same manner as Example 1 except that in the process of adding a polymer, 3.5 parts by mass of a mixture of polymer 1 and SBS (blending ratio: polymer 1/SBS=40 parts by mass/60 parts by mass) was added and, then, stirring was performed for 180 minutes. Moreover, the asphalt compositions of Examples 19 and 20 were prepared in the same manner as Example 14 except that 3.5 parts by mass of a mixture of polymer 17 and SBS (blending ratio: polymer 17/SBS=40 parts by mass/60 parts by mass) was added and, then, stirring was performed for 180 minutes.

Moreover, the asphalt composition of Example 9 was prepared by the same method as Example 8 except that 3.5 parts by mass of a mixture of polymer 1 and SBS (blending ratio: polymer 1/SBS=60 parts by mass/40 parts by mass) was added. Moreover, the asphalt composition of Example 21 was prepared by the same method as Example 20 except that 3.5 parts by mass of a mixture of polymer 17 and SBS (blending ratio: polymer 17/SBS=60 parts by mass/40 parts by mass) was added.

As for Examples 7 to 9 and 19 to 21, SBS used was as follows.

Examples 7 and 19: Kraton D1184 (a radial polymer SBS having a styrene content of 30%, a diblock content of 14.5%, and a weight average molecular weight of 400,000 in terms of polystyrene)

Examples 8 to 9 and 20 to 21: Kraton D1101 (a linear polymer SBS having a styrene content of 31%, a diblock content of 17.0%, and a weight average molecular weight of 180,000 in terms of polystyrene)

Moreover, the asphalt composition of Example 10 was prepared such a way that in the process of adding a polymer, 3.5 parts by mass of polymer 13 was added in small portions under stirring based on 100 parts by mass of asphalt, after complete addition, stirring was performed at a revolving speed of 6,000 rpm for 90 minutes, then 0.2 parts by mass of sulfur was added, and stirring was further performed for 60 minutes.

<Preparation of Asphalt Mixture>

An asphalt composition as obtained in Examples 1 to 25 and Comparative Examples 1 to 8 and an aggregate were mixed in a total mixture amount of 10 kg using a heater-equipped laboratory mixer having a volume of 27 liters, and an asphalt mixture for road paving was thus obtained as a dense-graded mixture. That is to say, an aggregate having a blending ratio of No. 6 crushed stone/No. 7 crushed stone/crushed sand/fine sand/stone powder of 36/19/27/12/6(%) was used, and 5.5 parts by mass of the asphalt composition and 94.5 parts by mass of the aggregate were mixed. The aggregate used was crushed stone and crushed sand from Iwafune-machi, Shimotsuga-gun, Tochigi Prefecture, fine sand of Sakae-machi, Imba-gun, Chiba Prefecture, and stone powder of Yamasuge-cho, Sano-shi, Tochigi Prefecture. The particle size distribution of the aggregate used in the asphalt mixture is shown in Table 4 below.

TABLE 4

| Aggregate | | Percentage passing (%) |
|---|---|---|
| Sieve mesh (mm) | 19 | 100 |
| | 13.2 | 99.6 |
| | 4.75 | 64.2 |
| | 2.36 | 43.1 |
| | 0.6 | 27 |
| | 0.3 | 19.7 |
| | 0.15 | 9.9 |
| | 0.075 | 6.1 |
| Amount of asphalt composition (% by mass) | | 5.5 |

More specifically, the mixing operation was as follows. That is to say, first, 94.5 parts by mass of the dense-graded aggregate having a predetermined particle size was introduced into a mixer and dry-mixed for 25 seconds, then 5.5 parts by mass of the asphalt composition obtained in Example 1 was introduced into the mixer, wet mixing was performed for 50 seconds, and a dense-graded asphalt mixture was thus obtained. Dry mixing and final mixing were both performed at a mixing temperature of 177° C.

<Characteristics of Asphalt Compositions and Others>

Various physical properties of asphalt compositions or asphalt mixtures were measured by the following methods. Their results are shown in Tables 5 to 7. Moreover, Table 7 also shows the results of evaluating the weather resistance and the adhesion of polymers 1 to 27.

<Softening Point (Ring-and-Ball Method)>

The softening point of the asphalt compositions was measured in accordance with JIS-K 2207. A prescribed ring was filled with a sample and horizontally held in a glycerin solution, a 3.5 g ball was placed in the center of the sample, the solution temperature was raised at a rate of 5° C./min, and the temperature was measured when the sample came into contact with the bottom plate of the ring stand due to the weight of the ball.

<Melt Viscosity>

Measurement was performed with a Brookfield viscometer at 160° C.

<Penetration>

The penetration was determined according to JIS-K 2207 by measuring the length of penetration of a defined needle for 5 seconds into the sample kept at 25° C. in a constant-temperature water bath.

<Elongation>

According to JIS-K 2207, the sample was poured into a form, made into a prescribed shape, and then kept at 15° C. in a constant-temperature water bath. Next, the sample was pulled at a rate of 5 cm/min. The distance of elongation of the sample until the sample was broken was measured.

<Dispersibility>

The average particle diameter of the polymer in the asphalt composition immediately after adjustment was measured. As for the measurement method, observation was made using transmitted light by a digital microscope. The measurement apparatus used was a VHX-2000 digital microscope manufactured by KEYENCE CORPORATION. Measurement conditions were as follows:

Measurement temperature: 25° C.
Magnification: 1,000
Measurement mode: Transmitted light Sample adjustment method: A 10 mg asphalt composition after being stirred was placed on a glass slide and allowed to stand still for 20 seconds on a hot plate heated to 180° C. to melt. Then, a cover glass was placed on the molten asphalt composition to thinly spread the composition. This was left to stand at room temperature for 30 minutes and observed using the digital microscope. The smaller the average particle diameter (the diameter of dispersed particles) was, the shorter the time until dissolution in asphalt was and until demonstration of performance was and, therefore, the better the evaluation was.

<High-Temperature Storage Stability (Separation Characteristics)>

Immediately after the production of an asphalt composition, the asphalt composition was poured to the upper limit of an aluminum can having an inner diameter of 50 mm and a height of 130 mm and heated for 24 hours in an oven at 180° C. Then, the aluminum can was taken out and naturally cooled. Next, the asphalt composition cooled to room temperature was cut at 4 cm from the lower edge and 4 cm from the upper edge, the respective softening points of the upper layer part and the lower layer part were measured, and the softening point difference was regarded as a measure of high-temperature storage stability. The smaller the softening point difference was, the better the evaluation of high-temperature storage stability was.

<Low-Temperature Elongation>

The elongation of the asphalt compositions containing 3.5 parts by mass of polymers 1 to 27 (in Examples 7 to 9 and 19 to 21, asphalt compositions having a content of 3.5 parts by mass in terms of a mixture of polymer 1 or polymer 17 with SBS) produced by the above method was measured in accordance with JIS-K 2207.

An asphalt sample having a specific shape was stretched at a rate of 5 cm/min in water at 5° C., and the length (cm) of the sample at break was measured.

An asphalt sample having a greater low-temperature elongation value was judged as having a better low-temperature performance, and the samples were evaluated as ○, Δ, and × in descending order of favorability.

20 cm or more: ○
10 cm or more: Δ
Less than 10 cm: ×

<Dynamic Stability>

Using the dense-graded asphalt mixtures obtained by the method of <Preparation of asphalt mixture> above, dynamic stability was evaluated in accordance with Test Method Manual B003. A specimen having a predetermined size was repeatedly loaded using a compact reciprocating rubber wheel at a prescribed temperature for a prescribed time at a prescribed speed, and dynamic stability (number of times/mm) was determined from the amount of deformation per unit time.

A specimen having a greater value was judged as having a better flow rutting resistance, and the specimens were evaluated as ⊚, ○, Δ, or × in descending order of favorability.

20,000 times/mm or more: ⊚
10,000 times/mm or more: ○
5,000 times/mm or more: Δ
Less than 5,000 times/mm: ×

<Amount of Polymer Added, at which a Softening Point of 60° C. is Achieved (Ring-and-Ball Method)>

The softening point of asphalt compositions was measured in accordance with JIS-K 2207.

A prescribed ring was filled with a sample and horizontally held in a glycerin solution, a 3.5 g ball was placed in the center of the sample, the solution temperature was raised at a rate of 5° C./min, and the temperature was measured when the sample came into contact with the bottom plate of the ring stand due to the weight of the ball.

The amount of a polymer added, at which the softening point became 60° C., was measured. A polymer added in a smaller amount was judged as being more effective and also as being more favorable from the viewpoint of economy, and the polymers were evaluated as ⊚, ○, Δ, or × in descending order of favorability.

Less than 2.5% by mass: ⊚
2.5% by mass or more and less than 3.0% by mass: ○
3.0% by mass or more and less than 3.3% by mass: Δ
3.3% by mass or more: ×

<Heat Deterioration Resistance of Polymer>

The asphalt compositions containing 3.5 parts by mass of polymers 1 to 27 produced by the above method (in Examples 7 to 9 and 19 to 21, asphalt compositions having a content of 3.5 parts by mass in terms of a mixture of polymer 1 or polymer 17 with SBS) were stored at 190° C. and sampled after a lapse of a predetermined time, and changes in the molecular weight distribution of the polymers were analyzed by GPC.

Heat deterioration of a polymer results in a lowered peak height of the polymer as determined by GPC and, therefore, a polymer that showed a smaller change in peak height from the pre-storage peak height was judged as having a better heat deterioration resistance. That is to say, evaluations were made according to the number of days taken until the peak height change reached 30% or more, and the polymers were evaluated as ○, Δ, or × in descending order of favorability.

2 days or more: ○
1 day or more and less than two days: Δ
Less than 1 day: ×

<Weather Resistance: UV Resistance of Polymer>

Polymers 1 to 27 were irradiated with ultraviolet rays instead of sunlight using a xenon lamp (an irradiance of 60 W/m$^2$, manufactured by Suga Test Instruments Co., Ltd., SX75) in a simulative manner to evaluate weather resistance.

In order to expedite evaluation, polymers 1 to 27 were independently heated at 200° C. for a little more than 5 minutes, then pressed for 2 minutes using a 10-ton press to form sheets having a thickness of 2 mm, and used as samples.

The peak heights of the polymers as determined by GPC were confirmed to be lowered due to ultraviolet irradiation. A polymer that showed a smaller change in peak height from the pre-ultraviolet-irradiation peak height was judged as having a better heat deterioration resistance and being more favorable. That is to say, evaluations were made according to the ultraviolet irradiation time taken until the peak height change of a polymer as determined by GPC reached 30% or more, and the polymers were evaluated as ○, Δ, or × in descending order of favorability.

48 hours or more: ○
24 hours or more and less than 48 hours: Δ
Less than 24 hours: ×

<Adhesion>

Polymers 1 to 27 produced by the above method were measured by the following method.

First, 10 g of a polymer was placed on one end of a metal plate (SUS plate) having a length of 15 cm×a width of 10 cm, and the plate was tilted at a tilt angle of 45 degrees to allow the polymer to fall from another end. At that time, the amount of the polymer adhering to the metal plate was visually checked. A polymer, a smaller amount of which adhered, was judged as having a better workability in a transport process, and the polymers were evaluated as ⊚, ○, Δ, or × in descending order of favorability.

Almost no amount adhered: ⊚
Small amount adhered: ○
Moderate amount adhered: ΔLarge amount adhered: ×

TABLE 5

| | | Example 1 | Example 2 | Example 3 | Example 4 | Example 5 | Example 6 | Example 7 | Example 8 | Example 9 |
|---|---|---|---|---|---|---|---|---|---|---|
| Component | Polymer | Polymer 1 | Polymer 2 | Polymer 3 | Polymer 4 | Polymer 5 | Polymer 12 | Polymer 1 + SBS | Polymer 1 + SBS | Polymer 1 + SBS |
| | Asphalt | | | | Straight asphalt 60-80 | | | | | |
| Physical property | Softening point (° C.) | 67 | 64 | 68 | 63 | 62 | 68 | 69 | 63 | 66 |
| | Melt viscosity (mPa · s)(160° C.) | 407 | 413 | 333 | 388 | 366 | 415 | 385 | 360 | 377 |
| | Penetration (1/10 mm) | 45 | 45 | 43 | 44 | 47 | 43 | 47 | 47 | 46 |

TABLE 5-continued

|  |  |  |  |  |  |  |  |  |  |
|---|---|---|---|---|---|---|---|---|---|
| Elongation (cm)(15° C.) | 74 | 70 | 59 | 60 | 80 | 79 | 77 | 76 | 74 |
| Dispersibility (μm) | 1 or less | 2 | 3 | 5 | 5 | 2 | 4 | 4 | 3 |
| Dynamic stability (number of times/mm) | ○ | ○ | Δ | Δ | X | ◎ | ○ | Δ | Δ |
| Low-temperature elongation (cm)(5° C.) | Δ | X | Δ | Δ | Δ | Δ | ○ | ○ | ○ |
| Amount (% by mass) added, at which a softening point of 60° C. is achieved (% by mass) | X | ○ | X | X | X | ○ | X | X | X |
| Heat degradation resistance | Δ | ○ | Δ | Δ | X | ○ | Δ | Δ | Δ |
| Weather resistance | Δ | ○ | Δ | Δ | X | ○ | — | — | — |
| Adhesion (transport ability) | ◎ | ○ | Δ | ○ | ◎ | ○ | — | — | — |

|  |  | Example 10 | Example 11 | Example 12 | Example 13 | Example 14 | Example 15 | Example 16 | Example 17 |
|---|---|---|---|---|---|---|---|---|---|
| Component | Polymer | Polymer 13 + sulfur | Polymer 14 | Polymer 15 | Polymer 16 | Polymer 17 | Polymer 18 | Polymer 19 | Polymer 20 |
|  | Asphalt | Straight asphalt 60-80 | | | | | | | |
| Physical property | Softening point (° C.) | 68 | 68 | 67 | 71 | 66 | 65 | 67 | 69 |
|  | Melt viscosity (mPa·s)(160° C.) | 401 | 439 | 428 | 471 | 433 | 429 | 438 | 455 |
|  | Penetration (1/10 mm) | 46 | 44 | 44 | 38 | 44 | 46 | 45 | 42 |
|  | Elongation (cm)(15° C.) | 62 | 68 | 70 | 64 | 71 | 75 | 74 | 68 |
|  | Dispersibility (μm) | 2 | 5 | 2 | 4 | 8 | 5 | 5 | 5 |
|  | Dynamic stability (number of times/mm) | ◎ | ○ | ○ | ○ | ○ | ○ | ○ | ○ |
|  | Low-temperature elongation (cm)(5° C.) | Δ | Δ | Δ | Δ | X | X | X | Δ |
|  | Amount (% by mass) added, at which a softening point of 60° C. is achieved (% by mass) | ○ | ○ | ○ | ◎ | ◎ | ○ | Δ | Δ |
|  | Heat degradation resistance | Δ | ○ | ○ | ○ | ○ | ○ | ○ | ○ |
|  | Weather resistance | X | Δ | Δ | ○ | ○ | ○ | Δ | Δ |
|  | Adhesion (transport ability) | ○ | ◎ | X | ○ | ○ | ○ | Δ | X |

TABLE 5-continued

|  |  | Example 18 | Example 19 | Example 20 | Example 21 | Example 22 | Example 23 | Example 24 | Example 25 |
|---|---|---|---|---|---|---|---|---|---|
| Component | Polymer | Polymer 26 | Polymer 17 + SBS | Polymer 17 + SBS | Polymer 17 + SBS | Polymer 21 | Polymer 22 | Polymer 25 | Polymer 27 |
|  | Asphalt |  |  |  | Straight asphalt 60-80 |  |  |  |  |
| Physical property | Softening point (° C.) | 67 | 67 | 62 | 65 | 66 | 62 | 65 | 71 |
|  | Melt viscosity (mPa·s)(160° C.) | 429 | 402 | 382 | 393 | 402 | 373 | 440 | 477 |
|  | Penetration (1/10 mm) | 46 | 46 | 46 | 47 | 45 | 47 | 44 | 38 |
|  | Elongation (cm)(15° C.) | 75 | 73 | 74 | 73 | 72 | 82 | 69 | 65 |
|  | Dispersibility (μm) | 6 | 10 | 10 | 9 | 2 | 5 | 15 | 5 |
|  | Dynamic stability (number of times/mm) | ⊙ | Δ | Δ | Δ | ◯ | X | ◯ | ◯ |
|  | Low-temperature elongation (cm)(5° C.) | X | ◯ | ◯ | ◯ | Δ | Δ | X | X |
|  | Amount (% by mass) added, at which a softening point of 60° C. is achieved (% by mass) | ◯ | ◯ | Δ | ◯ | X | X | X | ⊙ |
|  | Heat degradation resistance | ◯ | Δ | Δ | Δ | Δ | X | ◯ | ◯ |
|  | Weather resistance | ◯ | — | — | — | X | X | ◯ | ◯ |
|  | Adhesion (transport ability) | ◯ | — | — | — | ◯ | ⊙ | Δ | ⊙ |

TABLE 6

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Component | Polymer | Polymer 6 | Polymer 7 | Polymer 8 | Polymer 9 | Polymer 10 | Polymer 11 | Polymer 23 | Polymer 24 |
|  | Asphalt |  |  |  | Straight asphalt 60-80 |  |  |  |  |
| Physical property | Softening point (° C.) | 70 | 66 | 64 | 54 | 70 | 69 | 62 | 66 |
|  | Melt viscosity (mPa·s)(160° C.) | 411 | 408 | 430 | 355 | 467 | 416 | 388 | 430 |
|  | Penetration (1/10 mm) | 40 | 42 | 40 | 46 | 38 | 40 | 46 | 44 |
|  | Elongation (cm)(15° C.) | 87 | 46 | 43 | 67 | 61 | 69 | 70 | 72 |
|  | Dispersibility (μm) | 38 | 31 | 47 | 46 | 32 | 40 | 30 | 30 |
|  | Dynamic stability (number of times/mm) | ◯ | ◯ | Δ | ◯ | Δ | ◯ | Δ | ◯ |
|  | Low-temperature elongation (cm)(5° C.) | X | Δ | X | Δ | X | X | X | X |
|  | Amount (% by mass) added, at which a softening point of 60° C. is achieved (% by mass) | ⊙ | Δ | X | X | X | X | X | X |
|  | Heat degradation resistance | ◯ | Δ | Δ | X | ◯ | ◯ | ◯ | ◯ |
|  | Weather resistance | ◯ | Δ | Δ | X | Δ | ◯ | ◯ | ◯ |
|  | Adhesion (transportability) | Δ | Δ | ◯ | ⊙ | X | X | X | X |

TABLE 7

| | | Example 26 | Example 27 | Example 28 | Example 29 | Example 30 | Comparative Example 9 | Comparative Example 10 | Comparative Example 11 |
|---|---|---|---|---|---|---|---|---|---|
| Component | Hydrogenated polymer | Polymer 1 | Polymer 2 | Polymer 3 | Polymer 4 | Polymer 5 | Polymer 6 | Polymer 8 | Polymer 9 |
| | Asphalt | | | | Straight asphalt 60-80 | | | | |
| Physical property | Softening point (° C.) | 109 | 106 | 118 | 105 | 102 | 109 | 101 | 96 |
| | Melt viscosity (mPa · s)(160° C.) | 2000 | 2010 | 1993 | 2005 | 1905 | 2101 | 1988 | 1855 |
| | Penetration (1/10 mm) | 30 | 28 | 30 | 29 | 33 | 35 | 29 | 39 |
| | Elongation (cm)(15° C.) | 50 | 44 | 48 | 40 | 55 | 57 | 39 | 58 |
| | Dispersibility (μm) | 3 | 3 | 11 | 10 | 11 | 56 | 71 | 72 |
| | High-temperature storage stability (° C.) | 3 | 8 | 3 | 13 | 15 | 31 | 39 | 38 |

The present application is based on a Japanese patent application filed on Jan. 17, 2014 (Japanese Patent Application No. 2014-007292), a Japanese patent application filed on Apr. 17, 2014 (Japanese Patent Application No. 2014-085857), a Japanese patent application filed on Oct. 1, 2014 (Japanese Patent Application No. 2014-203035), a Japanese patent application filed on Oct. 1, 2014 (Japanese Patent Application No. 2014-203036), a Japanese patent application filed on Nov. 17, 2014 (Japanese Patent Application No. 2014-232735), and a Japanese patent application filed on Nov. 17, 2014 (Japanese Patent Application No. 2014-232736), the contents of which are incorporated herein by reference in their entirety.

INDUSTRIAL APPLICABILITY

The asphalt composition comprising the polymer of the present invention can be used in the road paving, roofing/waterproofing sheet, and sealant fields, and can be suitably used in the road paving field in particular.

The invention claimed is:

1. A polymer comprising a conjugated diene monomer unit and a vinyl aromatic monomer unit,
   wherein the polymer has a polymer block (A) comprising the vinyl aromatic monomer unit as a main component and a polymer block (B) comprising the conjugated diene monomer unit and the vinyl aromatic monomer unit,
   a content of the polymer block (A) is 10% by mass or more and 40% by mass or less,
   a bulk density of the polymer is 0.05 g/mL or more and 0.45 g/mL or less, and
   a specific surface area of the polymer is 0.10 m$^2$/g or more and 0.60 m$^2$/g or less,
   in the polymer block (B), a content of a short-chain vinyl aromatic monomer-polymerized moiety comprising 2 to 6 vinyl aromatic monomer units is 50% by mass or more based on the content of the vinyl aromatic monomer unit being 100% by mass.
2. The polymer according to claim 1, wherein a hydrogenation rate of double bonds in the conjugated diene monomer unit is 95 mol % or more.
3. The polymer according to claim 1, wherein a hydrogenation rate of double bonds in the conjugated diene monomer unit is 0 mol % or more and less than 50 mol %.
4. The polymer according to claim 1, wherein a hydrogenation rate of double bonds in the conjugated diene monomer unit is 50 mol % or more and less than 95 mol %.
5. The polymer according to claim 1, wherein the specific surface area is 0.30 m$^2$/g or more and 0.60 m$^2$/g or less.
6. The polymer according to claim 1, wherein the specific surface area is 0.10 m$^2$/g or more and less than 0.30 m$^2$/g.
7. The polymer according to claim 1, wherein a proportion of components that pass through a sieve having a mesh size of 3.35 mm and do not pass through a sieve having a mesh size of 0.425 mm is less than 80% by mass based on a total amount of crumbs.
8. The polymer according to claim 1, wherein the polymer has a peak molecular weight of less than 200,000.
9. The polymer according to claim 1, wherein a content of the vinyl aromatic monomer unit is 20% by mass or more and 60% by mass or less.
10. The polymer according to claim 1, wherein the content of the short-chain vinyl aromatic monomer-polymerized moiety is 70% by mass or more.
11. The polymer according to claim 1, wherein the polymer has a functional group.
12. An asphalt composition comprising 0.5 parts by mass or more and 50 parts by mass or less of the polymer according to claim 1 and 100 parts by mass of an asphalt.
13. An asphalt composition comprising:
   a mixture comprising the polymer according to claim 1 and a block copolymer (a); and
   an asphalt,
   wherein the block copolymer (a) has a polymer block (A') comprising at least one vinyl aromatic monomer unit as a main component and a polymer block (C) comprising at least one conjugated diene monomer unit as a main component,
   a content of the mixture is 0.5 parts by mass or more and 50 parts by mass or less based on 100 parts by mass of the asphalt, and
   a content of the block copolymer (a) in the mixture is 15 to 85% by mass.
14. The asphalt composition according to claim 12, further comprising 0.03 parts by mass or more and 3 parts by mass or less of sulfur or a sulfur compound.
15. The asphalt composition according to claim 13, further comprising 0.03 parts by mass or more and 3 parts by mass or less of sulfur or a sulfur compound.
16. An asphalt composition comprising:
   a mixture comprising the polymer according to claim 11 and a block copolymer (a); and
   an asphalt,
   wherein the block copolymer (a) has a polymer block (A') comprising at least one vinyl aromatic monomer unit as a main component and a polymer block (C) comprising at least one conjugated diene monomer unit as a main component, a content of the mixture is 0.5 parts by mass or more and 50 parts by mass or less based on 100 parts by mass of the asphalt, and a content of the block copolymer (a) in the mixture is 15 to 85% by mass.

17. An asphalt composition comprising 0.5 parts by mass or more and 50 parts by mass or less of the polymer according to claim 11 and 100 parts by mass of an asphalt.

* * * * *